United States Patent
Mochizuki

(10) Patent No.: US 10,468,995 B2
(45) Date of Patent: Nov. 5, 2019

(54) POWER CONVERTER

(71) Applicant: Mitsubishi Electric Corporation, Tokyo (JP)

(72) Inventor: Tomomi Mochizuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/771,666

(22) PCT Filed: Jan. 28, 2016

(86) PCT No.: PCT/JP2016/052536
§ 371 (c)(1),
(2) Date: Apr. 27, 2018

(87) PCT Pub. No.: WO2017/130357
PCT Pub. Date: Aug. 3, 2017

(65) Prior Publication Data
US 2018/0323723 A1    Nov. 8, 2018

(51) Int. Cl.
*H02M 1/42* (2007.01)
*H02M 1/08* (2006.01)
(Continued)

(52) U.S. Cl.
CPC ............. *H02M 7/062* (2013.01); *H02M 1/08* (2013.01); *H02M 1/143* (2013.01); *H02M 7/06* (2013.01);
(Continued)

(58) Field of Classification Search
CPC ...... H02M 1/4208; H02M 1/08; H02M 1/047; H02M 1/083; H02M 1/143; H02M 7/062; H02M 7/06; H02M 7/12
See application file for complete search history.

(56) References Cited

U.S. PATENT DOCUMENTS 5,479,336 A    12/1995 Motoki et al.
2015/0102759 A1*  4/2015 Shimomugi ........ H02M 1/4225
                                                        318/504
(Continued)

FOREIGN PATENT DOCUMENTS

JP    2763479 B2    1/1995
JP    3485047 B2    4/2000
(Continued)

OTHER PUBLICATIONS

International Search Report of the International Searching Authority dated Apr. 19, 2016 for the corresponding international application No. PCT/JP2016/052536 (and English translation).

(Continued)

*Primary Examiner* — Adolf D Berhane
*Assistant Examiner* — Sisay G Tiku
(74) *Attorney, Agent, or Firm* — Posz Law Group, PLC

(57) ABSTRACT

A power converter includes a rectifier that converts AC power from an AC power supply into DC power, a short circuit unit that short-circuits the AC power supply via a reactor, and a controller that controls the short circuit operation of the short circuit unit. The controller changes the number of the short circuit operation during a half cycle of an output waveform of the AC power supply on the basis of a load condition, and causes a delay time before short circuit from a zero crossing point of the output waveform of the AC power supply after changing the number of the short circuit operation to vary from a delay time before short circuit from a zero crossing point of the output waveform of the AC power supply before changing the number of the short circuit operation.

12 Claims, 16 Drawing Sheets

(51) Int. Cl.
   *H02M 1/04*   (2006.01)
   *H02M 1/14*   (2006.01)
   *H02M 7/06*   (2006.01)
   *H02M 7/12*   (2006.01)
   *H02M 1/00*   (2006.01)

(52) U.S. Cl.
   CPC ...... *H02M 7/12* (2013.01); *H02M 2001/0048* (2013.01)

(56) References Cited

U.S. PATENT DOCUMENTS

| | | | | |
|---|---|---|---|---|
| 2017/0149352 A1* | 5/2017 | Arisawa | .................. | H02M 7/06 |
| 2017/0207718 A1* | 7/2017 | Shimomugi | .......... | H02M 1/083 |
| 2017/0222572 A1* | 8/2017 | Yamakawa | ............. | H02M 1/08 |
| 2017/0302150 A1* | 10/2017 | Takayama | ............... | H02M 1/08 |

FOREIGN PATENT DOCUMENTS

| | | | |
|---|---|---|---|
| JP | 2006-174689 | * | 6/2006 |
| JP | 2006-174689 A | | 6/2006 |
| JP | 2009-100499 | * | 10/2007 |
| JP | 2009-100499 A | | 5/2009 |
| JP | 2015-171196 | * | 3/2014 |
| JP | 2015-171196 A | | 9/2015 |

OTHER PUBLICATIONS

Extended European Search Report dated Dec. 21, 2018 issued in corresponding EP patent application No. 16887944.3.

* cited by examiner

CURRENT PATH WHEN SHORT CIRCUIT ELEMENT IS TURNED ON

CURRENT PATH WHEN SHORT CIRCUIT ELEMENT IS TURNED OFF

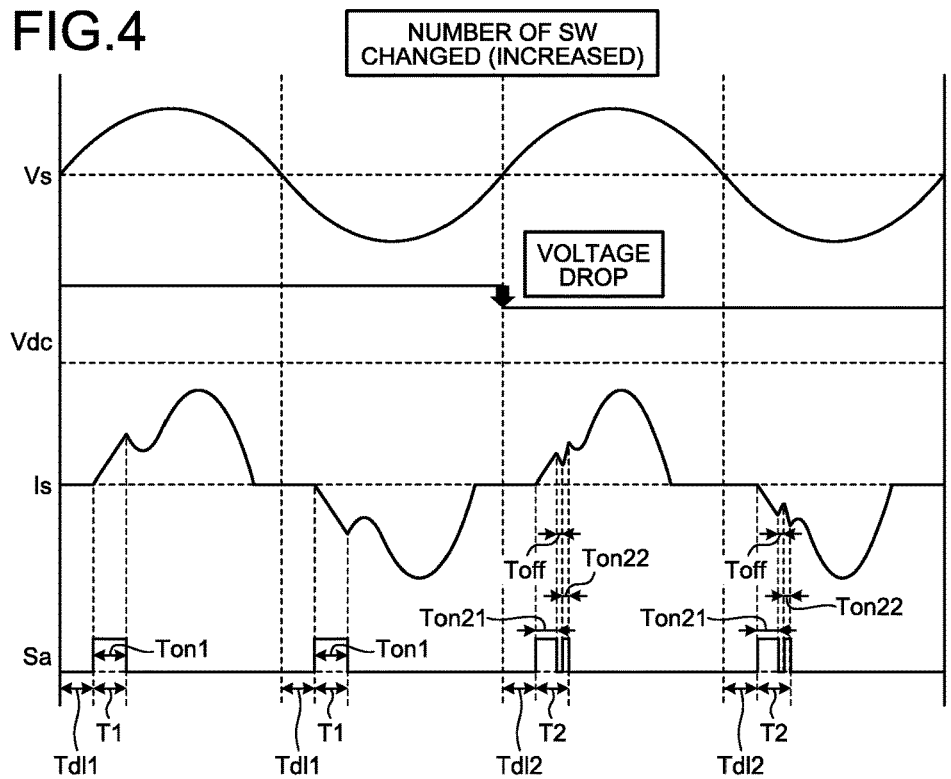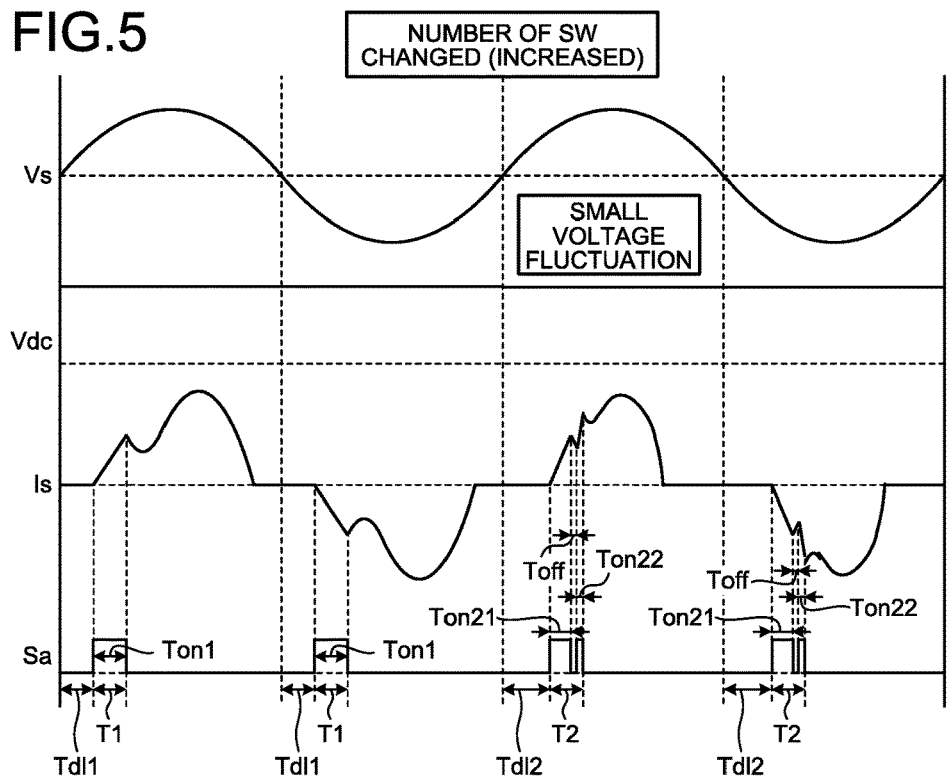

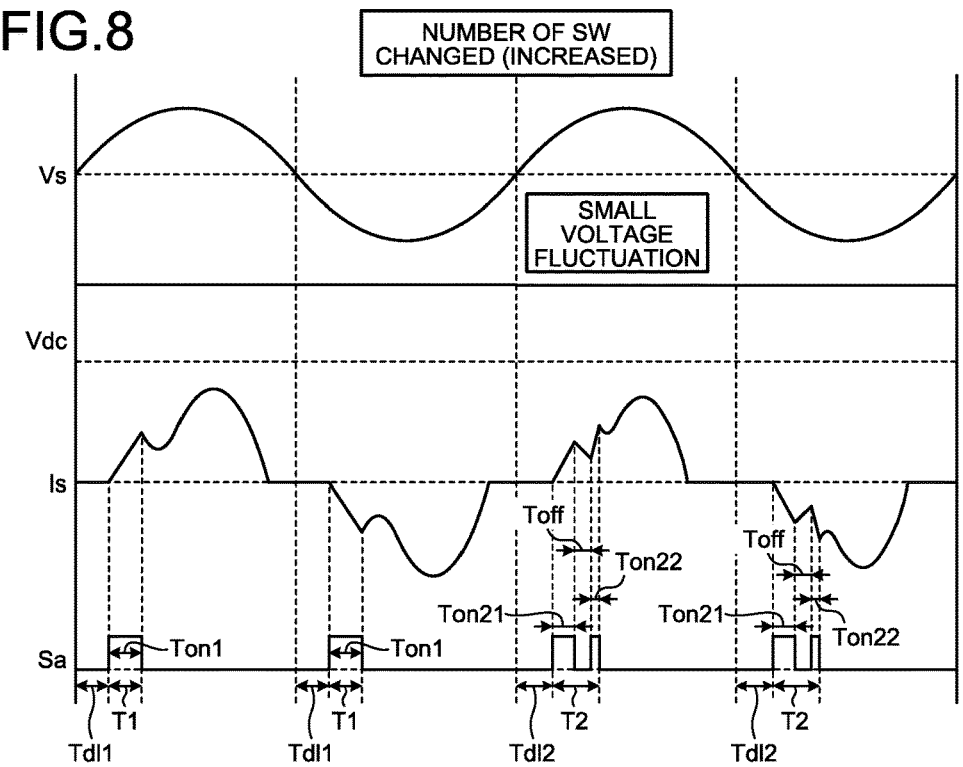
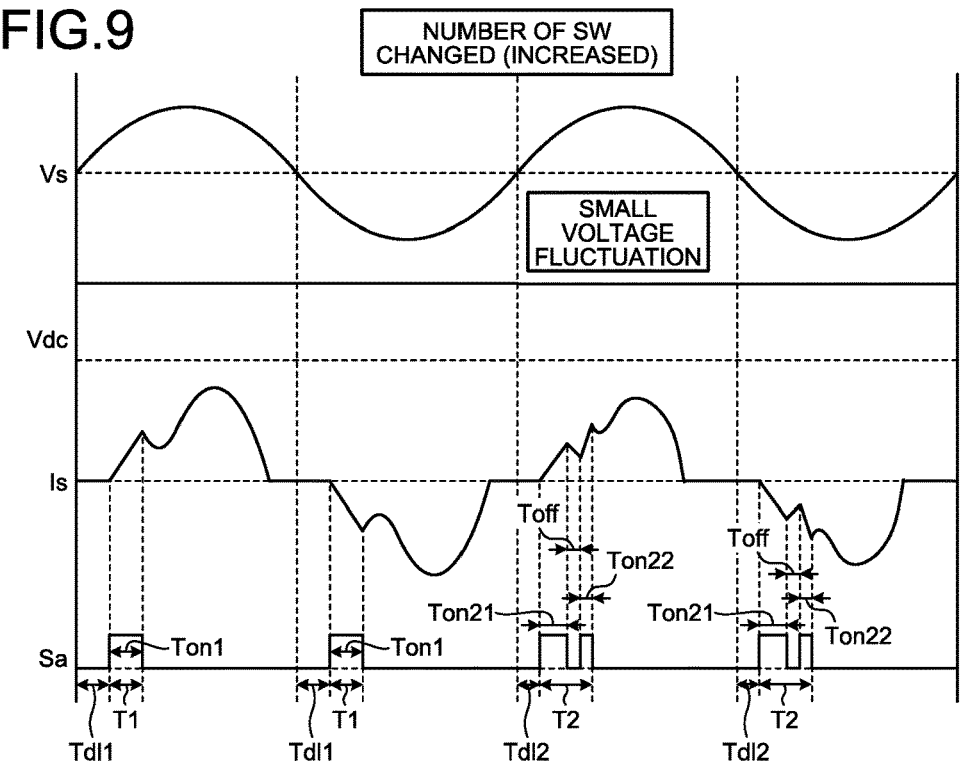

US 10,468,995 B2

POWER CONVERTER

CROSS REFERENCE TO RELATED APPLICATION

This application is a U.S. national stage application of International Patent Application No. PCT/JP2016/052536 filed on Jan. 28, 2016, the disclosure of which is incorporated herein by reference.

TECHNICAL FIELD

The present invention relates to a power converter that converts AC power into DC power.

BACKGROUND

A DC power supply device disclosed in Patent Literature 1 below is configured to short-circuit a switch unit only once during a half cycle of a power supply to allow a current to pass through a reactor, reduce a harmonic current, and improve a power factor. However, in order to reduce harmonics by short-circuiting the switch unit only once during the half cycle of the power supply, an inductance value of the reactor needs to be increased, which increases heat generated in the reactor. This is because an input current that is reduced to zero after allowed to flow by the operation of the switch unit not only reduces the power factor but also causes the amount of higher order harmonics to be larger than usual. Moreover, when the short circuit is made only once, a large amount of energy needs to be stored in the reactor to prevent the input current from being zero.

A conventional technology according to Patent Literature 2 below short-circuits the switch unit twice or more during the half cycle of the power supply so that the inductance value of the reactor and the heat generation can be reduced. Moreover, the reduction in the inductance value reduces the outer shape of the reactor, thereby the size of the reactor can be reduced.

PATENT LITERATURE

Patent Literature 1: Japanese Patent No. 2763479
Patent Literature 2: Japanese Patent No. 3485047

In the conventional techniques typified by Patent Literatures 1 and 2 above, the number of switching operations of the switch unit during the half cycle of the power supply varies depending on a load condition when considering a factor such as the power factor, loss, harmonics, noise, or design load. Considering these factors, the number of switching operations needs to be changed during operation, but a change in the short circuit time at the time of changing the number of switching operations causes a sudden change in a DC voltage unless a delay time before the start of switching from a zero point of the power supply voltage is controlled appropriately. In that case, the operation may stop due to instability of the DC voltage control, overvoltage, or insufficient voltage to adversely affect a load using the DC voltage.

SUMMARY

The present invention has been made in view of the above, and an object of the invention is to obtain a power converter capable of preventing a fluctuation in a DC voltage even when the number of switching operations of a short circuit unit that short-circuits an AC power supply is changed in accordance with a load.

A power converter according to an aspect of the present invention includes a rectifier to convert AC power from an AC power supply into DC power, a short circuit unit to short-circuit the AC power supply via a reactor, and a controller to control the short-circuit operation of the short circuit unit. The controller changes the number of the short circuit operations during a half cycle of an output waveform of the AC power supply on the basis of a load condition, and causes a delay time before short circuit from a zero crossing point of the output waveform of the AC power supply after changing the number of the short circuit operations to vary from a delay time before short circuit from a zero crossing point of the output waveform of the AC power supply before changing the number of the short circuit operations.

The present invention can prevent a fluctuation in a DC voltage even when the number of switching operations of the short circuit unit that short-circuits the AC power supply is changed in accordance with a load.

BRIEF DESCRIPTION OF DRAWINGS

FIG. 4 is a diagram illustrating a fluctuation in a DC voltage detected when the number of switching operations during a half cycle of the power supply is increased from once to twice with no change in a delay time.

FIG. 5 is a diagram illustrating a fluctuation in the DC voltage detected when the number of switching operations during the half cycle of the power supply is increased from once to twice with a change in the delay time.

FIG. 8 is a diagram illustrating a fluctuation in the DC voltage detected when the number of switching operations during the half cycle of the power supply is increased from once to twice with a change in each of the delay time and an energization time.

FIG. 9 is a diagram illustrating a fluctuation in the DC voltage detected when the number of switching operations during the half cycle of the power supply is increased from once to twice with a change in each of the delay time and the energization time.

DETAILED DESCRIPTION

A power converter according to embodiments of the present invention will now be described in detail with reference to the drawings. Note that the present invention is not limited to the following embodiments.

First Embodiment

Figure 1:
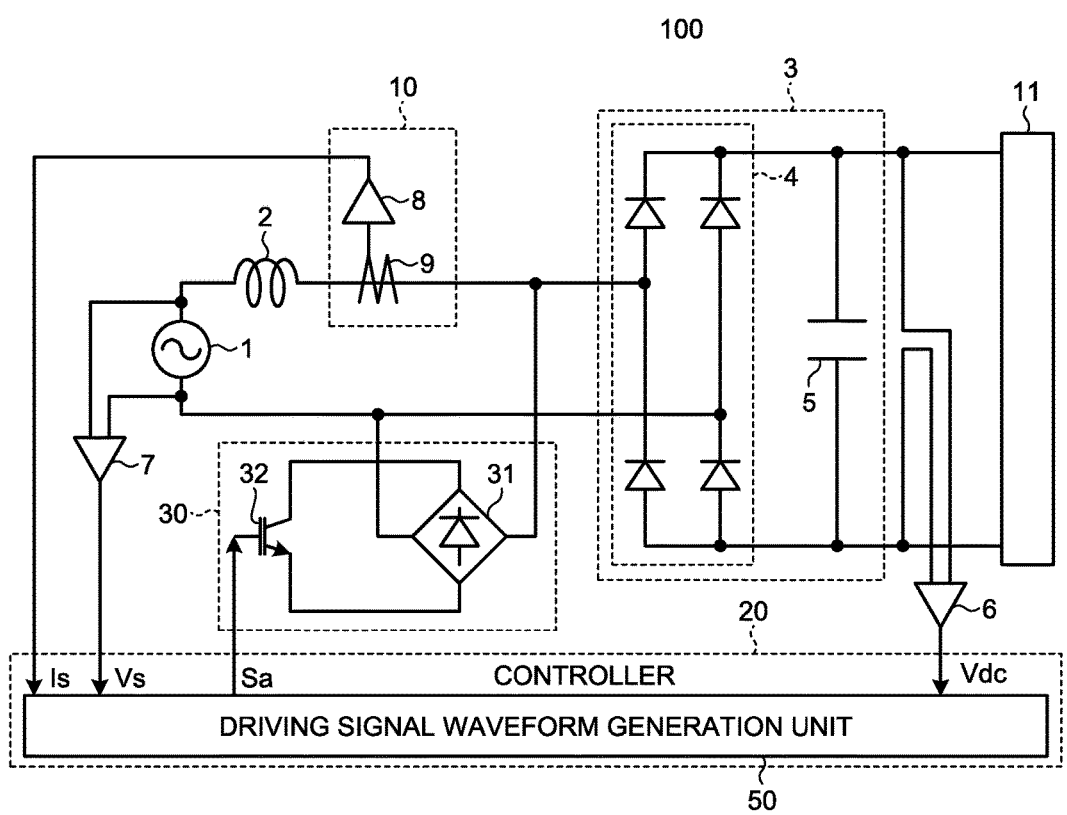
FIG. 1 is a diagram illustrating a configuration example of a power converter according to first and second embodiments.

FIG. 1 is a diagram illustrating a configuration example of a power converter 100 according to a first embodiment and a second embodiment to be described later. As illustrated in FIG. 1, the power converter 100 includes a rectifier 3 that converts AC power from an AC power supply 1 which is a power supply unit into DC power, a reactor 2 that is connected between the AC power supply 1 and the rectifier 3, a power supply voltage detector 7 that detects a power supply voltage Vs of the AC power supply 1, current detection means 10 that detects a power supply current Is flowing through the reactor 2, a short circuit unit 30 that short-circuits the AC power supply 1 via the reactor 2, and a controller 20 that generates a driving signal Sa which is one or a plurality of switching pulses during a half cycle of the AC power supply 1 and controls opening and closing operations of the short circuit unit 30 with the driving signal Sa being generated.

The reactor 2 is connected closer to the AC power supply 1 than the short circuit unit 30 is, and is inserted between one input terminal of the rectifier 3 and the AC power supply 1 in the illustrated example. The current detection means 10 includes a current detecting element 9 disposed between the reactor 2 and the rectifier 3, and a current detector 8 that detects a current flowing through the current detecting element 9. The current detector 8 can be an amplifier or a level shift circuit, for example. The current detecting element 9 can be a current transformer or a shunt resistor, for example.

The rectifier 3 includes a rectifier circuit 4 composed of a diode bridge in which four diodes are combined, and a smoothing capacitor 5 that is connected between output terminals of the rectifier circuit 4 and smoothes a voltage of the full-wave rectified waveform output from the rectifier circuit 4.

The short circuit unit 30 being a bidirectional switch includes a diode bridge 31 connected in parallel to the AC power supply 1 via the reactor 2 and a short circuit element 32 connected to both output ends of the diode bridge 31. When the short circuit element 32 is a metal-oxide-semiconductor field-effect transistor, a gate of the short circuit element 32 is connected to a driving signal waveform generation unit 50 of the controller 20 so that the short circuit element 32 is turned on and off by the driving signal Sa from the driving signal waveform generation unit 50. When the short circuit element 32 is turned on, the AC power supply 1 is short-circuited via the reactor 2 and the diode bridge 31.

The controller 20 is composed of a microcomputer and includes the driving signal waveform generation unit 50 that generates the driving signal Sa which is a switching pulse for controlling the short circuit element 32 on the basis of a DC voltage Vdc and the power supply voltage Vs.

The driving signal waveform generation unit 50 causes the short circuit unit 30 to be turned on and off once or a plurality of times during the half cycle of the power supply by current-open-loop control in a short circuit operation mode. Hereinafter, the operation of the short circuit unit 30 will be described with reference to several drawings.

Figure 2:
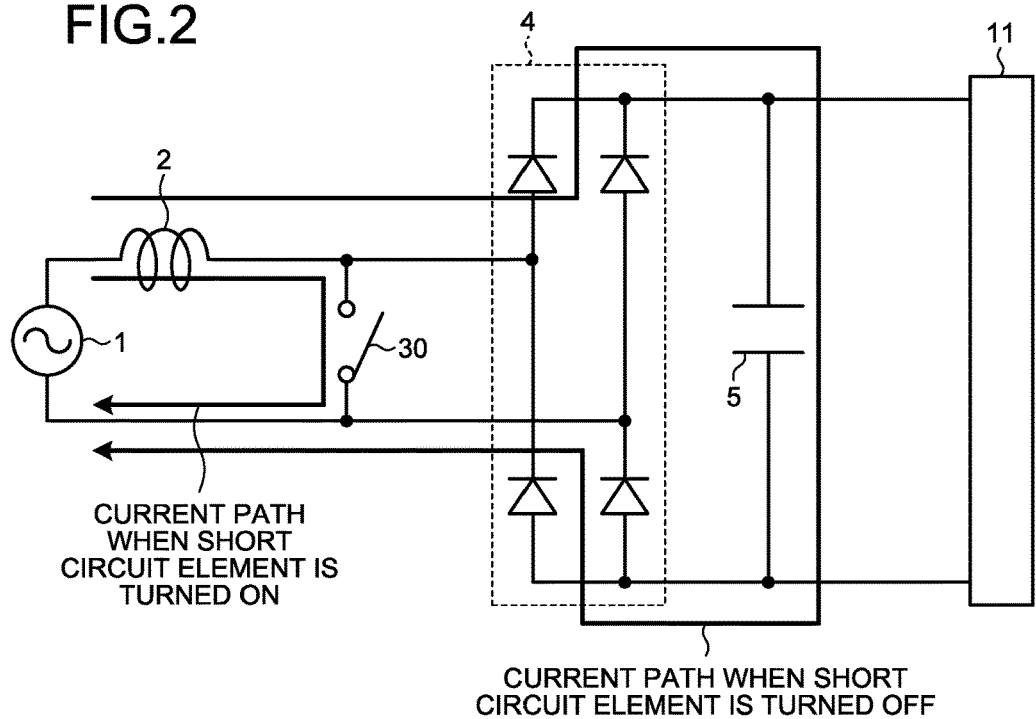
FIG. 2 is a diagram illustrating a simplified circuit including a reactor, a short circuit unit, a rectifier circuit, and a smoothing capacitor.

FIG. 2 is a diagram illustrating a simplified circuit including the reactor 2, the short circuit unit 30, the rectifier circuit 4, and the smoothing capacitor 5. FIG. 2 indicates current paths when the short circuit unit 30 is turned on and turned off.

Figure 3:
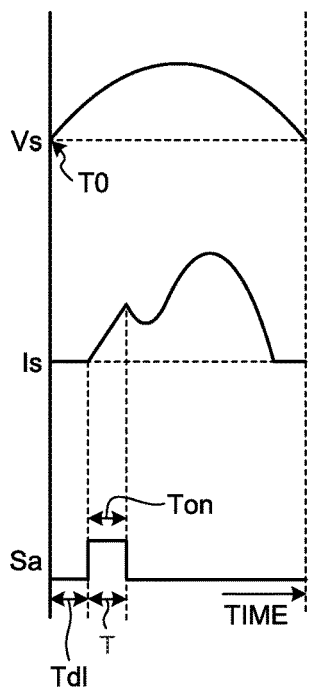
FIG. 3 is a diagram illustrating a waveform of a power supply current when a short circuit element is short-circuited once in a positive half cycle of an AC power supply.

FIG. 3 is a diagram illustrating waveforms of main components when the short circuit element 32 is short-circuited once in a positive half cycle of the AC power supply 1. FIG. 3 illustrates from the top a waveform of the power supply voltage Vs, a waveform of the power supply current Is flowing through the reactor 2, and a waveform of the driving signal Sa as a single pulse when the short circuit unit 30 is short-circuited once in the positive half cycle of the power supply.

Reference character "Tdl" indicates a delay time before the driving signal Sa is turned on at a point when a predetermined time elapses from a zero crossing point T0 from which the power supply voltage Vs rises. Reference character "Ton" indicates an on time of the driving signal Sa generated within the positive half cycle of the power supply voltage. Reference character "T" indicates a period from when the driving signal Sa is turned on to when the signal is turned off. Note that the on time Ton and the period T have the same width in the illustrated example because the driving signal Sa is a single pulse.

The short circuit unit 30 is turned on when the driving signal Sa is turned on at the point the delay time Tdl elapses. At this time, a closed circuit is formed by the AC power supply 1, the reactor 2, and the short circuit unit 30 so that the AC power supply 1 is short-circuited via the reactor 2. The power supply current Is thus flows through the closed circuit to cause magnetic energy to be accumulated in the reactor 2. The accumulated energy is discharged to the side of a load 11 at the same time the short circuit unit 30 is turned off, and is rectified by the rectifier circuit 4 to be transferred to the smoothing capacitor 5. Such a series of operations allows the power supply current Is to flow through a path as illustrated in FIG. 2. As a result, the conduction angle of the power supply current Is can be wider than that in a passive mode in which the power factor is not improved, whereby the power factor can be improved.

The short circuit operation mode can control the energy accumulated in the reactor 2 by controlling the width of each of the delay time Tdl and the on time Ton for the short circuit unit 30, and can boost the DC voltage Vdc steplessly up to a specific value.

Although FIG. 3 illustrates the example in which the short circuit unit 30 is switched once during the half cycle of the power supply, the number of switching operations may be increased for the purpose of improving the power factor, reducing harmonics, or boosting the DC voltage depending on the load condition. Note that the term "switching" refers to a short circuit operation of the short circuit unit 30, and the number of switching operations refers to the number of short circuit operations of the short circuit unit 30. Moreover, the load condition is a qualitative or quantitative condition determined depending on whether the operation of the load is light or heavy. When the load condition is expressed qualitatively, for example, light load typically refers to a case where a relatively small torque current is required to operate the load as desired, and heavy load typically refers to a case where a relatively large torque current is required to operate the load as desired.

FIG. 4 is a first diagram illustrating a fluctuation in the DC voltage Vdc detected when the number of switching operations during the half cycle of the power supply is increased from once to twice.

FIG. 4 illustrates as an example the waveform of the power supply voltage Vs corresponding to two cycles, the waveform of the DC voltage Vdc detected by a DC voltage detector 6, the waveform of the power supply current Is flowing through the reactor 2 detected by the current detection means 10, and the waveform of the driving signal Sa. Note that in the operation example of FIG. 4, the number of switching operations is changed between the first cycle and the second cycle of the power supply voltage, and the value of the DC voltage Vdc represents an average value in the first cycle of the power supply voltage and an average value in the second cycle of the power supply voltage.

The switching operation is performed once in each of the positive half cycle and the negative half cycle in the first cycle of the power supply voltage. On the other hand, the switching operation is performed twice in each of the positive half cycle and the negative half cycle in the second cycle of the power supply voltage.

Reference character "Ton1" indicates an on time of the driving signal Sa generated during the positive and negative half cycles in the first cycle of the power supply voltage. Reference character "T1" indicates a period from when the driving signal Sa is turned on to when the signal is turned off. The on time Ton1 and the period T1 have the same width. Reference character "Tdl1" indicates a delay time before the driving signal Sa is turned on from the zero crossing point of the power supply voltage Vs in the first cycle of the power supply voltage.

Reference character "Ton21" indicates an on time of a first driving signal Sa between two driving signals Sa generated on each of the positive and negative sides in the second cycle of the power supply voltage, and reference character "Ton22" indicates an on time of the second driving signal Sa. Reference character "Toff" indicates a release period of the short circuit unit 30 from when the first driving signal Sa is turned off to when the second driving signal Sa is turned on. Reference character "T2" indicates a sum of the time from when the first driving signal Sa is turned on to when the first driving signal is turned off, the time from when the first driving signal Sa is turned off to when the second driving signal Sa is turned on, and the time from when the second driving signal Sa is turned on to when the second driving signal is turned off. That is, the period T2 is equal to a sum of the on time Ton21, the off time Toff, and the on time Ton22. Reference character "Tdl2" indicates a delay time before the first driving signal Sa is turned on from a zero crossing point of the power supply voltage Vs in the second cycle of the power supply voltage.

The operation example of FIG. 4 assumes that the period T1 is equal to the period T2, and the delay time Tdl1 is equal to the delay time Tdl2. When the period T1 is equal to the period T2, the sum of the on time Ton21 and the on time Ton22 is short relative to the on time Ton1.

Focusing on the DC voltage Vdc, it can be seen that the DC voltage Vdc drops when the number of switching operations is switched. Switching is performed twice in the period T2 under the condition where the period T1 is equal to the period T2 with no change in the delay time Tdl1 and the delay time Tdl2, whereby the sum of the on time Ton21 and the on time Ton22 becomes shorter than the on time Ton1, and the DC voltage Vdc after the number of switching operations is increased becomes lower than the DC voltage Vdc before the number of switching operations is increased.

FIG. 5 is a second diagram illustrating a fluctuation in the DC voltage Vdc detected when the number of switching operations during the half cycle of the power supply is increased from once to twice. In FIG. 5, the DC voltage before and after the number of switching operations is increased has a small fluctuation and is equal in value. The fluctuation in the DC voltage Vdc is small because the delay time is increased from Tdl1 to Tdl2 though the period T1 is equal to the period T2. When the switching period is the same, a boost ratio of the DC voltage can be increased by performing switching at a point that is closer to a point where the power supply voltage Vs is large, that is, closer to a peak of the power supply voltage.

Although FIGS. 4 and 5 illustrate the example in which the number of switching operations is increased from once to twice, the number of switching operations is not limited to such example. That is, the driving signal Sa generated during the half cycle of the power supply may be greater in number after the number of switching operations is switched than before the number of switching operations is switched.

Figure 6:
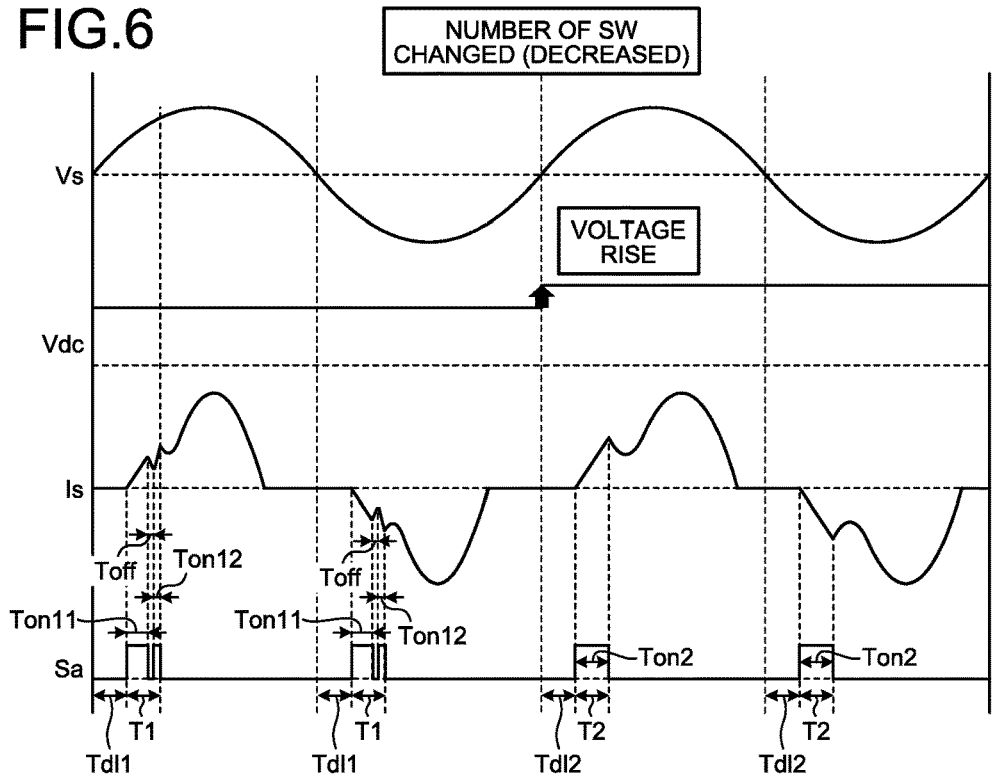
FIG. 6 is a diagram illustrating a fluctuation in the DC voltage detected when the number of switching operations during the half cycle of the power supply is decreased from twice to once with no change in the delay time.

FIG. 6 is a first diagram illustrating a fluctuation in the DC voltage Vdc detected when the number of switching operations during the half cycle of the power supply is decreased from twice to once.

FIG. 6 illustrates the waveforms of the power supply voltage Vs and the driving signal Sa corresponding to two cycles as with FIGS. 4 and 5, and also illustrates a change in the waveform of each of the DC voltage Vdc and the power supply current Is when the number of switching operations is changed from twice to once between the first cycle and the second cycle of the power supply voltage.

As illustrated in FIG. 6, the switching operation is performed twice in each of the positive half cycle and the negative half cycle in the first cycle of the power supply voltage. On the other hand, the switching operation is performed once in each of the positive half cycle and the negative half cycle in the second cycle of the power supply voltage.

Reference character "Ton11" indicates an on time of a first driving signal Sa between two driving signals Sa generated during the positive half cycle in the first cycle of the power supply voltage, and reference character "Ton12" indicates an on time of the second driving signal Sa. Reference character "Toff" indicates the off time from when the first driving signal Sa is turned off to when the second driving signal Sa is turned on. Reference character "T1" indicates a period from when the first driving signal Sa is turned on to when the second driving signal Sa is turned off. Specifically, the period T1 indicates a sum of the time from when the first driving signal Sa is turned on to when the first driving signal is turned off, the time from when the first driving signal Sa is turned off to when the second driving signal Sa is turned on, and the time from when the second driving signal Sa is turned on to when the second driving signal is turned off. That is, the period T1 is equal to a sum of the on time Ton11, the off time Toff, and the on time Ton12. Reference character "Tdl1" indicates the delay time before the first driving signal Sa is turned on from the zero crossing point of the power supply voltage Vs in the first cycle of the power supply voltage.

Reference character "Ton2" indicates an on time of the driving signal Sa generated during the positive half cycle in the second cycle of the power supply voltage. Reference character "T2" indicates a period from when the driving signal Sa is turned on to when the signal is turned off. The on time Ton2 and the period T2 have the same width. Reference character "Tdl2" indicates the delay time before the driving signal Sa is turned on from the zero crossing point of the power supply voltage Vs in the second cycle of the power supply voltage.

The operation example of FIG. 6 assumes that the period T1 is equal to the period T2, and the delay time Tdl1 is equal to the delay time Tdl2. When the period T1 is equal to the period T2, the on time Ton2 is long relative to the sum of the on time Ton11 and the on time Ton12.

Focusing on the DC voltage Vdc, it can be seen that the DC voltage Vdc rises when the number of switching operations is switched. Specifically, switching is performed twice in the period T1 under the condition where the period T2 is equal to the period T1 and the delay time Tdl1 and the delay time Tdl2 are not changed, whereby the sum of the on time Ton11 and the on time Ton12 becomes shorter than the on time Ton2, and the DC voltage Vdc after the number of switching operations is decreased becomes higher than the DC voltage Vdc before the number of switching operations is decreased.

Figure 7:
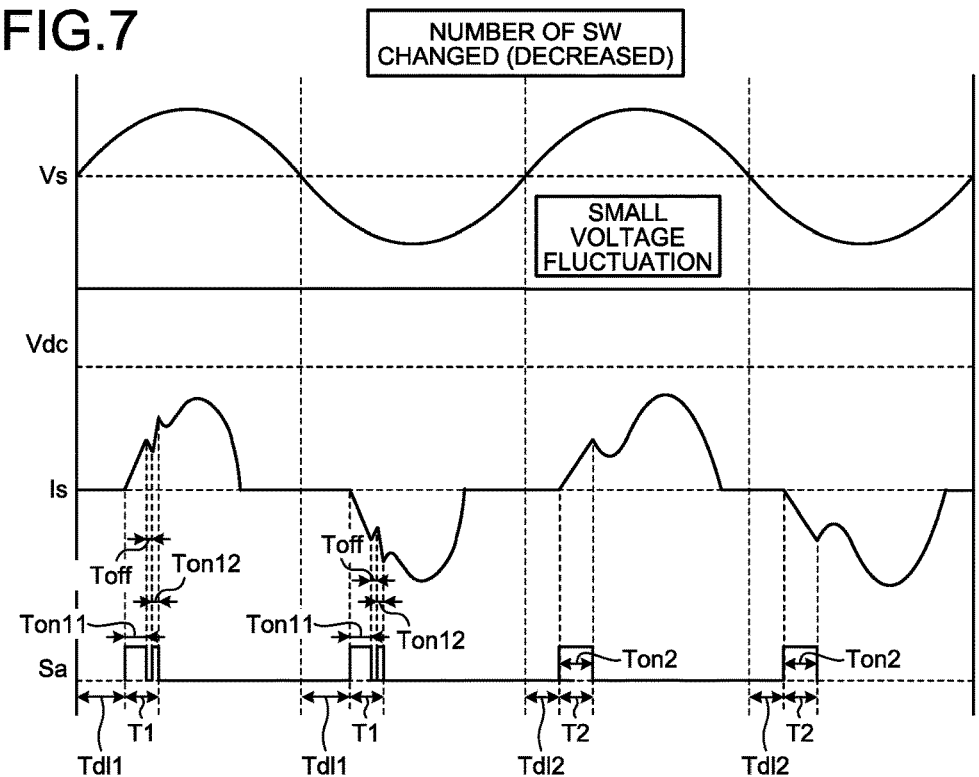
FIG. 7 is a diagram illustrating a fluctuation in the DC voltage detected when the number of switching operations during the half cycle of the power supply is decreased from twice to once with a change in the delay time.

FIG. 7 is a second diagram illustrating a fluctuation in the DC voltage detected when the number of switching operations during the half cycle of the power supply is decreased from twice to once. In FIG. 7, the DC voltage Vdc before and after the number of switching operations is decreased has a small fluctuation and is equal in value. The fluctuation in the DC voltage Vdc is small because the delay time is decreased from Tdl1 to Tdl2 though the period T1 is equal to the period T2. When the switching period is the same, a boost ratio of the DC voltage can be reduced by performing switching closer to a point where the power supply voltage Vs is small, that is, closer to the zero crossing point of the power supply voltage.

Although FIGS. 6 and 7 illustrate the example in which the number of switching operations is decreased from twice to once, the number of switching operations is not limited to such example. That is, the driving signal Sa generated during the half cycle of the power supply may be fewer in number after the number of switching operations is switched than before the number of switching operations is switched.

When changing the number of switching operations in accordance with the load condition, the power converter 100 of the first embodiment can reduce a fluctuation in the DC voltage by appropriately controlling the lengths of the delay times Tdl1 and Tdl2 in accordance with the tendency of the change in the number of switching operations. Therefore, a system with high stability can be constructed and the voltage can be boosted to a value higher than that of a conventional converter while the power factor is improved and the harmonics are reduced.

Moreover, the power converter 100 of the first embodiment can appropriately control the lengths of the delay times Tdl1 and Tdl2 in accordance with the tendency of the change in the number of switching operations, thereby the number of control parameters can be reduced. Therefore, an increase in load associated with tuning of an unnecessary parameter can be prevented.

Note that the controller 20 of the first embodiment controls, at the timing of changing the number of switching operations, the length of the delay time before the start of switching from the zero crossing point of the power supply voltage after the number of switching operations is changed. However, the length of the delay time may be controlled at a plurality of timings as long as a fluctuation in the voltage is within the allowable range.

The period and time including Tdl, Ton, and Toff of the first embodiment may be held as setting data for each number of switching operations in a non-volatile memory such as an EEPROM.

Moreover, the proportions of the times Ton and Toff in the periods T1 and T2 in the first embodiment may be held as setting data for each number of switching operations in a non-volatile memory such as the EEPROM.

The number of switching operations in the first embodiment may be changed depending on the power supply voltage Vs even under the same input load condition.

Second Embodiment

The first embodiment described above is adapted to stabilize the DC voltage Vdc by changing only the delay time Tdl when the number of switching operations is changed. Now, there will be described the operation in a case where the on time Ton, the period T, and the delay time Tdl are changed when the number of switching operations is changed.

FIG. 8 is a diagram illustrating the DC voltage Vdc detected when the number of switching operations is increased from once to twice. Unlike FIG. 4, the DC voltage Vdc before and after the number of switching operations is increased has a small fluctuation and is equal in value in FIG. 8. This is because a decrease in the DC voltage Vdc after the number of switching operations is increased, can be prevented by setting the on period T2 after the number of switching operations is increased to be longer than the on period T1 before the number of switching operations is increased. Moreover, the delay time Tdl2 is set longer than the delay time Tdl1, thereby the effect of preventing a decrease in the DC voltage Vdc can be enhanced.

FIG. 9 is a diagram illustrating the DC voltage Vdc detected when the number of switching operations is increased from once to twice. Unlike FIG. 4, the DC voltage Vdc before and after the number of switching operations is increased, has a small fluctuation and is equal in value in FIG. 9. The DC voltage Vdc after the number of switching operations is increased can be higher than that before the number of switching operations is increased, by setting the on period T2 after the number of switching operations is increased to be longer than the on period T1 before the number of switching operations is increased by an amount significantly larger than that in FIG. 8. At the same time, the delay time Tdl2 is set shorter than the delay time Tdl1 so that the effect of decreasing the DC voltage Vdc can be obtained. That is, the effect of decreasing the DC voltage Vdc can be obtained by setting the delay time Tdl2 shorter than the delay time Tdl1 even when the sum of the on time Ton21 and the on time Ton22 is considerably longer than the energization period T1 to cause an increase in the DC voltage Vdc. Therefore, the DC voltage Vdc before and after the number of switching operations is increased can have a small fluctuation and be equal in value overall.

Although FIGS. 8 and 9 illustrate the example in which the number of switching operations is increased from once to twice, the number of switching operations is not limited to such example. That is, the driving signal Sa generated during the half cycle of the power supply may be greater in number after the number of switching operations is switched than before the number of switching operations is switched.

Figure 10:
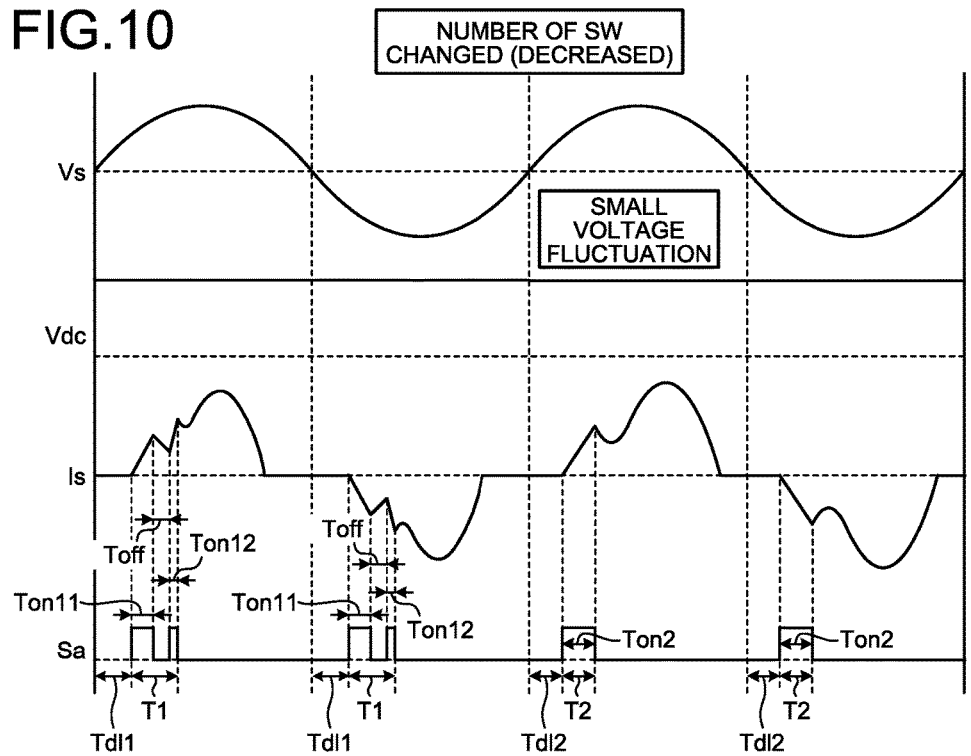
FIG. 10 is a diagram illustrating a fluctuation in the DC voltage detected when the number of switching operations during the half cycle of the power supply is decreased from twice to once with a change in each of the delay time and the energization time.

FIG. 10 is a diagram illustrating a fluctuation in the DC voltage Vdc detected when the number of switching operations during the half cycle of the power supply is decreased from twice to once. Unlike FIG. 6, the DC voltage Vdc before and after the number of switching operations is decreased has a small fluctuation and is equal in value in FIG. 10. This is because an increase in the DC voltage Vdc after the number of switching operations is decreased can be prevented by setting the on period T2 after the number of switching operations is decreased shorter than the on period T1 before the number of switching operations is decreased. Moreover, the delay time Tdl2 is set shorter than the delay time Tdl1, thereby enhancing the effect of preventing an increase in the DC voltage Vdc.

Figure 11:
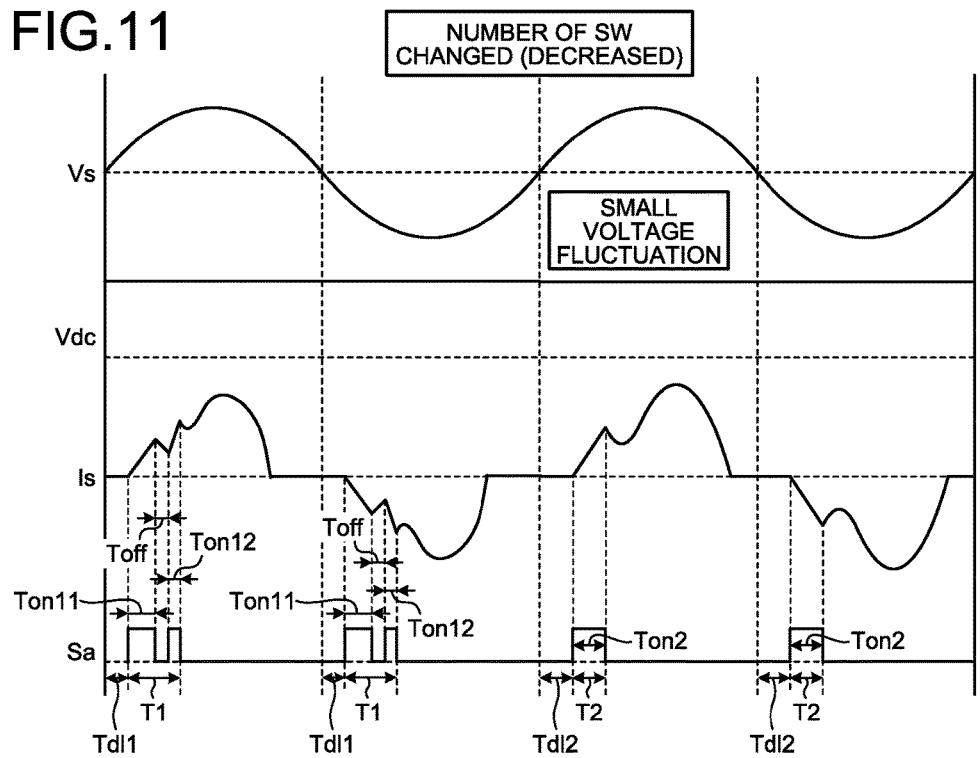
FIG. 11 is a diagram illustrating a fluctuation in the DC voltage detected when the number of switching operations during the half cycle of the power supply is decreased from twice to once with a change in each of the delay time and the energization time.

FIG. 11 is a diagram illustrating a fluctuation in the DC voltage Vdc detected when the number of switching operations is decreased from twice to once. Unlike FIG. 6, the DC voltage Vdc before and after the number of switching operations is decreased has a small fluctuation and is equal in value in FIG. 11. The DC voltage Vdc after the number of switching operations is decreased can be lower than that before the number of switching operations is decreased by setting the on period T2 after the number of switching operations is decreased shorter than the on period T1 before the number of switching operations is decreased by an amount significantly larger than that in FIG. 10. At the same time, the delay time Tdl2 is set longer than the delay time Tdl1, thereby obtaining the effect of increasing the DC voltage Vdc. That is, the effect of increasing the DC voltage Vdc can be obtained by setting the delay time Tdl2 longer than the delay time Tdl1 even when the sum of the on time Ton11 and the on time Ton12 is considerably shorter than the energization period T2 to cause a decrease in the DC voltage Vdc. Therefore, the DC voltage Vdc before and after the number of switching operations is decreased can have a small fluctuation and be equal in value overall.

Figure 12:
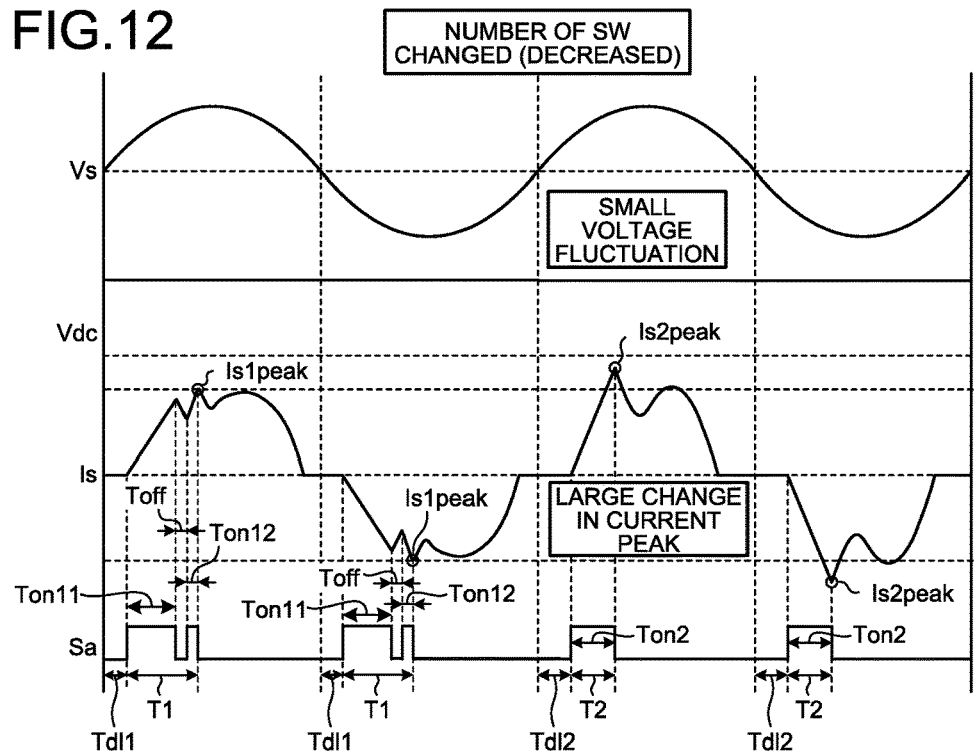
FIG. 12 is a diagram illustrating a fluctuation in the DC voltage and a change in the power supply current detected when the number of switching operations during the half cycle of the power supply is decreased from twice to once with a change in the delay time.

FIG. 12 is a first diagram illustrating a fluctuation in the DC voltage Vdc and a change in the power supply current Is detected when the number of switching operations is decreased from twice to once. In FIG. 12, the DC voltage Vdc before and after the number of switching operations is decreased has a small fluctuation and is equal in value unlike FIG. 6, while the power supply current Is has a larger peak value Is2peak after the number of switching operations is decreased than a peak value Is1peak before the number of switching operations is decreased. The DC voltage Vdc after the number of switching operations is decreased becomes lower than that before the number of switching operations is decreased by setting the on period T2 after the number of switching operations is decreased shorter than the on period T1 before the number of switching operations is decreased by an amount larger than that in FIG. 10. At the same time, the delay time Tdl2 is set longer than the delay time Tdl1, thereby obtaining the effect of increasing the DC voltage Vdc. The peak value of the power supply current Is is decreased by setting the period T2 shorter than the period T1, while the peak value of the power supply current Is is increased when the delay time Tdl2 is longer than the delay time Tdl1. Overall, in FIG. 12, the current after the number of switching operations is decreased is higher than that before the number of switching operations is decreased.

Figure 13:
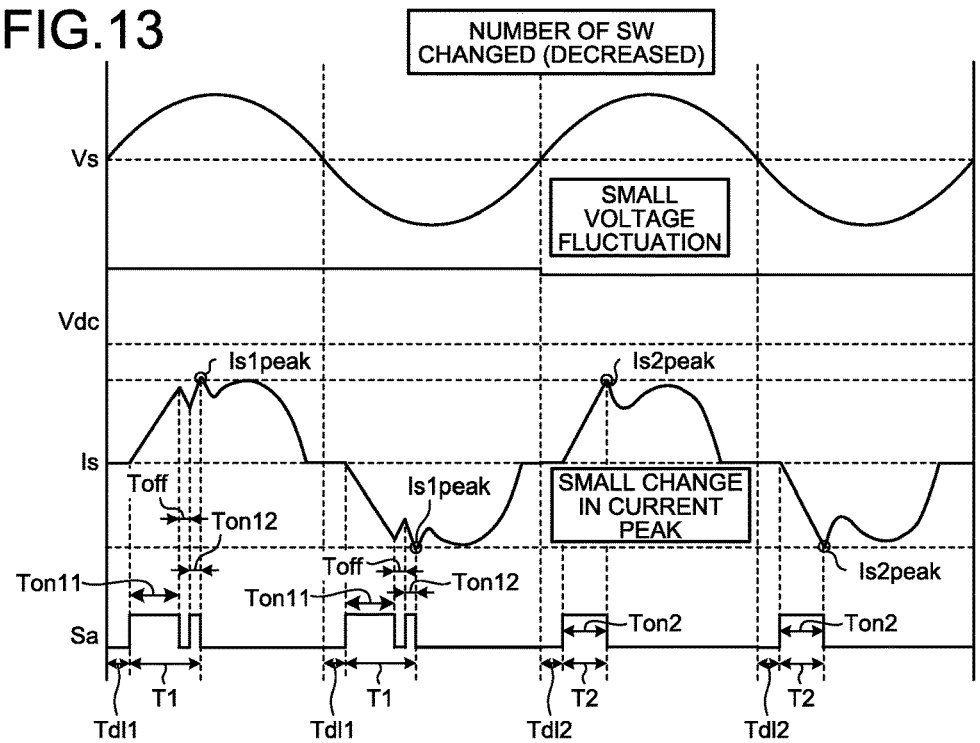
FIG. 13 is a diagram illustrating a fluctuation in the DC voltage and a change in the power supply current detected when the number of switching operations during the half cycle of the power supply is decreased from twice to once with a change in the delay time.

FIG. 13 is a second diagram illustrating a fluctuation in the DC voltage Vdc and a change in the power supply current Is detected when the number of switching operations is decreased from twice to once. In FIG. 13, unlike FIG. 12, the power supply current Is has a small change in the peak value from the peak value Is1peak before the number of switching operations is decreased to the peak value Is2peak after the number of switching operations is decreased, the peak values being equal in value. This is because the peak value Is2peak after the number of switching operations is decreased is reduced by setting the delay time Tdl2 in FIG. 13 shorter than the delay time Tdl2 in FIG. 12 though the energization time Ton2 after the number of switching operations is decreased is the same in FIGS. 12 and 13. A rate of increase in current varies depending on the magnitude of the power supply voltage Vs and the energization time Ton, where the rate increases as the power supply voltage Vs increases and as the energization time Ton increases. As another function, an average value of the DC voltage Vdc in the second cycle in the case of FIG. 13 is lower than that in FIG. 12. Harmonic control, stabilization of a bus voltage, and a reduction in the peak value of the power supply current can be achieved by changing the energization time Ton2 and the delay time Tdl2 depending on the purpose at the time of switching the number of switching operations.

When the on time and the period are changed at the time of changing the number of switching operations, the delay time before the start of switching from the zero crossing point of the power supply voltage is controlled at the same time, thereby reducing a fluctuation in the DC voltage and a change in the power supply current as described above.

Therefore, a system with high stability can be constructed and the voltage can be boosted to a value higher than that of a conventional converter while the power factor is improved and the harmonics are reduced.

Moreover, the power supply current flows through the AC power supply 1, the reactor 2, the diode bridge 31, and the short circuit element 32 while the short circuit unit 30 is short-circuited, that is, while the driving signal Sa is being output. Therefore, even when the current value is restricted due to the rating of a part such as the short circuit element 32, the on time and the period as well as the delay time are controlled before the start of switching from the zero crossing point of the power supply voltage at the time of changing the number of switching operations as described above. As a result, a part that costs less than that of a conventional converter can be selected. Thus, the peak value of the power supply current can be reduced to lower the rated value required for the part.

Furthermore, the power converter 100 of the second embodiment can appropriately control the lengths of the energization periods T1 and T2 and the delay times Tdl1 and Tdl2 in accordance with the tendency of the change in the number of switching operations, thereby reducing the number of control parameters. Therefore, an increase in load associated with tuning of an unnecessary parameter can be prevented.

Note that the controller 20 of the second embodiment controls, at the timing of changing the number of switching operations, the length of the delay time before the start of switching from the zero crossing point of the power supply voltage after the number of switching operations is changed. However, the length of the delay time may be controlled at a plurality of timings as long as a fluctuation in the voltage is within the allowable range.

The period and time including Tdl, Ton, and Toff of the second embodiment may be held as setting data for each number of switching operations in a non-volatile memory such as an EEPROM.

Moreover, the proportions of the times Ton and Toff in the periods T1 and T2 in the second embodiment may be held as setting data for each number of switching operations in a non-volatile memory such as the EEPROM.

The number of switching operations in the second embodiment may be changed depending on the power supply voltage Vs even under the same input load condition.

Third Embodiment

Figure 14:
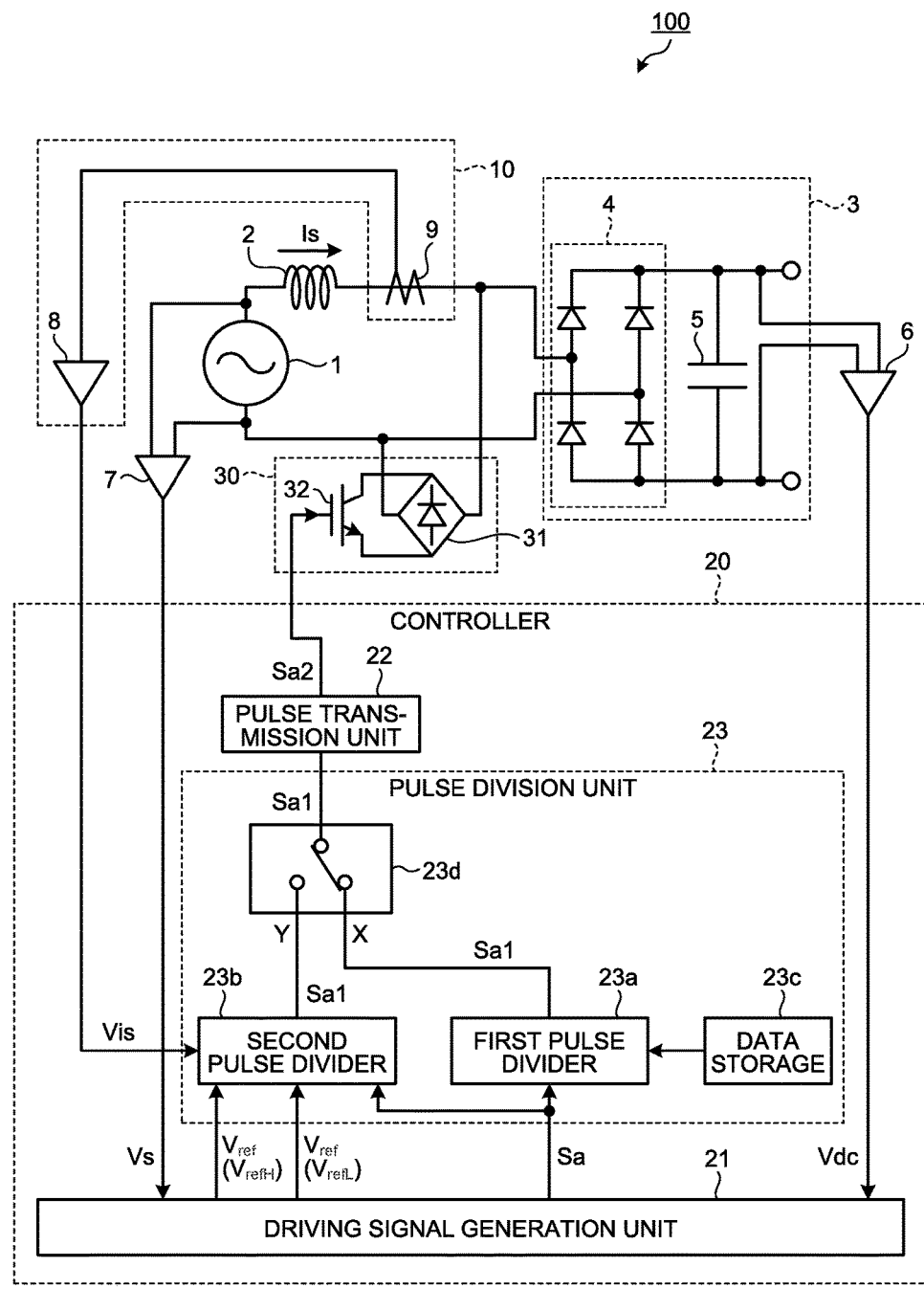
FIG. 14 is a diagram illustrating a configuration example of the power converter according to a third embodiment.

FIG. 14 is a diagram illustrating a configuration example of the power converter 100 according to a third embodiment. FIG. 14 illustrates in more detail the configuration of the driving signal waveform generation unit 50 of the controller 20 according to the first and second embodiments illustrated in FIG. 1. The controller 20 in FIG. 14 includes: a driving signal generation unit 21 that generates the driving signal Sa, which is a switching pulse for controlling the short circuit element 32 of the short circuit unit 30, and a reference voltage $V_{ref}$ on the basis of the DC voltage Vdc and the power supply voltage Vs; a pulse division unit 23 that divides the driving signal Sa from the driving signal generation unit 21 into a plurality of pulses and outputs driving signals Sa1, which is the plurality of pulses obtained after the division, to a pulse transmission unit 22; and the pulse transmission unit 22 that converts the driving signals Sa1 from the pulse division unit 23 into a driving signal Sa2 and transmits the driving signal Sa2 to the short circuit unit 30. The driving signal generation unit 21, the pulse transmission unit 22, and the pulse division unit 23 implement the functions of the driving signal waveform generation unit 50 of the first and second embodiments.

The reference voltage $V_{ref}$ is a hysteresis reference voltage which is a threshold for limiting the value of the power supply current Is. The reference voltage $V_{ref}$ includes a positive reference voltage $V_{refH}$ and a negative reference voltage $V_{refL}$. A circuit that generates the reference voltage $V_{ref}$ will be described later. Note that the output value of the current detection means 10 detecting the power supply current Is is a voltage value, whereby a detected value of the power supply current Is is expressed as a detected current voltage Vis in FIG. 14.

The pulse division unit 23 includes a first pulse divider 23a that divides the driving signal Sa into the driving signals Sa1 which is the plurality of pulses by software processing, a second pulse divider 23b that divides the driving signal Sa into the plurality of driving signals Sa1 by hardware processing, a data storage 23c that stores data required for calculation in the first pulse divider 23a, and a selector 23d that selects the driving signal Sa1 from the first pulse divider 23a or the driving signal Sa1 from the second pulse divider 23b and outputs the selected signal to the pulse transmission unit 22.

The selector 23d includes two terminals on the input side and outputs the driving signal Sa1 generated by the first pulse divider 23a to the pulse transmission unit 22 when the internal contact is connected to an X terminal, and outputs the driving signal Sa1 generated by the second pulse divider 23b to the pulse transmission unit 22 when the internal contact is connected to a Y terminal.

The pulse transmission unit 22 is composed of a level shift circuit and performs a voltage level shift that enables gate driving to convert the driving signals Sa1 from the pulse division unit 23 into the driving signal Sa2 being a gate drive signal, and output the driving signal Sa2 to the short circuit unit 30.

Figure 15:
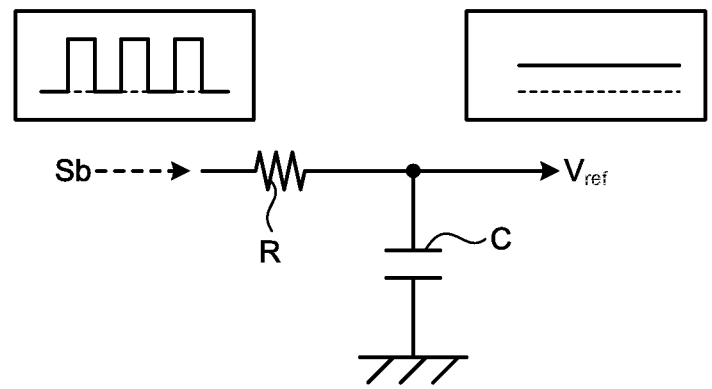
FIG. 15 is a first block diagram of a pulse control reference voltage generation circuit.
Figure 16:
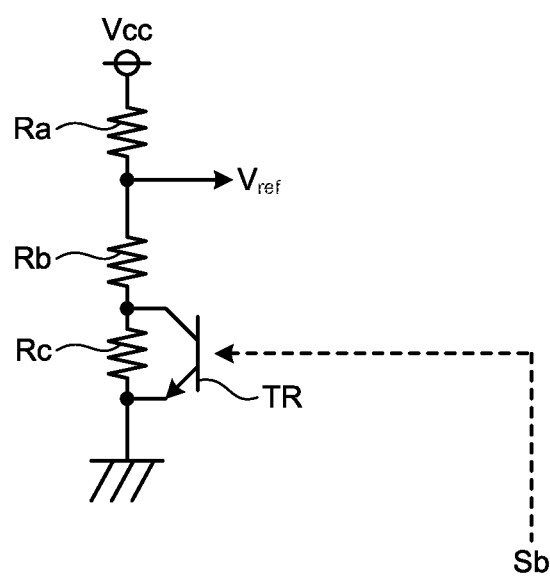
FIG. 16 is a second block diagram of the pulse control reference voltage generation circuit.

FIG. 15 is a first block diagram of a pulse control reference voltage generation circuit, and FIG. 16 is a second block diagram of the pulse control reference voltage generation circuit. The circuit of FIG. 15 generates the reference voltage $V_{ref}$ by converting a pulse width modulation signal, which is a port output Sb of the driving signal generation unit 21, into a direct current value by a low pass filter. In this case, the value of the reference voltage $V_{ref}$ can be changed seamlessly by controlling a duty ratio of the pulse width modulation signal. The circuit of FIG. 16 drives a switch TR using the port output Sb of the driving signal generation unit 21 to change the value of the reference voltage $V_{ref}$ stepwise by a division ratio of resistors Rb and Rc. Note that the reference voltage $V_{ref}$ may be generated not only by the circuit illustrated in FIG. 15 or the circuit illustrated in FIG. 16 but by a known circuit other than the circuits illustrated in FIGS. 15 and 16. Otherwise, a reference voltage $V_{ref}$ generated outside the controller 20 may be used.

Next, the configuration and operation of the second pulse divider 23b will be described.

Figure 17:
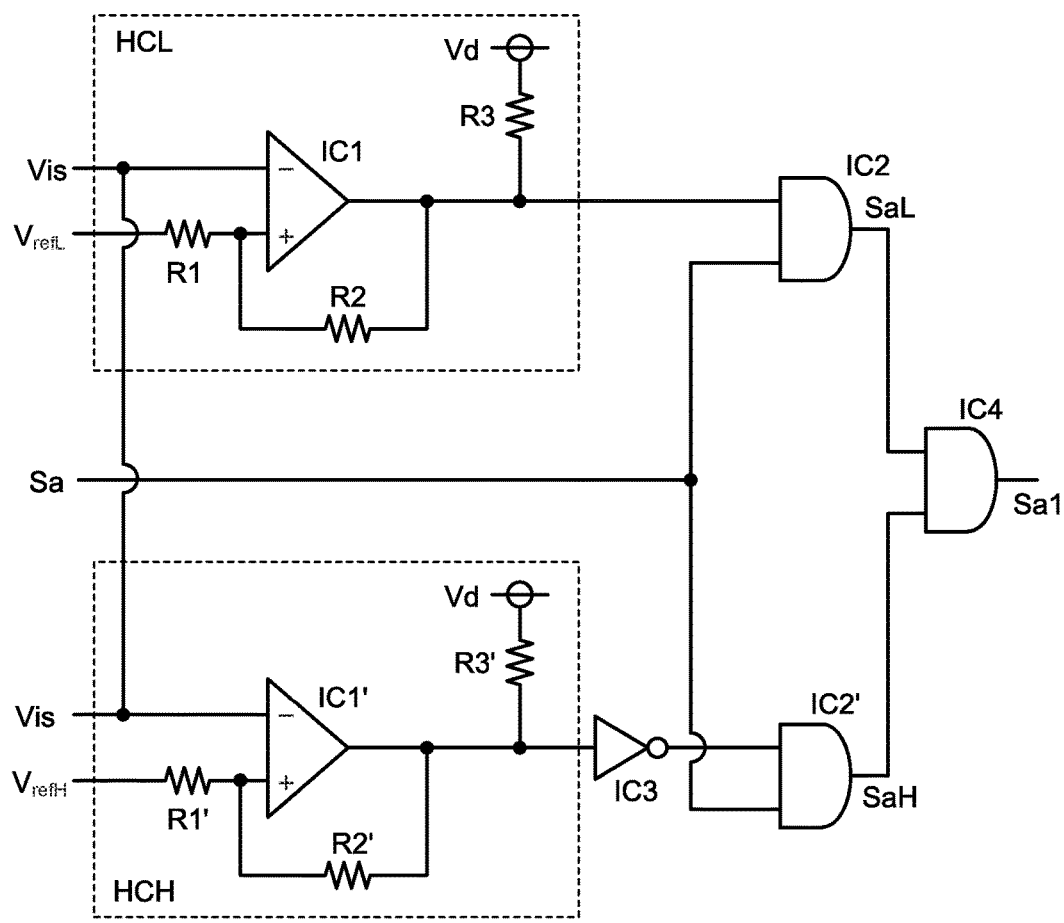
FIG. 17 is a diagram illustrating a configuration example of a second pulse divider.

FIG. 17 is a diagram illustrating a configuration example of the second pulse divider 23b. The second pulse divider 23b includes a positive hysteresis comparator HCH that determines hysteresis corresponding to a current control range on the positive side on the basis of the relationship among a positive upper limit threshold calculated by the following expression (1), a positive lower limit threshold calculated by the following expression (2), and the positive reference voltage $V_{refH}$ to control the waveform of the detected current voltage Vis, and a negative hysteresis comparator HCL that determines hysteresis corresponding to a current control range on the negative side on the basis of the relationship among a negative upper limit threshold calculated by expression (1), a negative lower limit threshold calculated by expression (2), and the negative reference voltage $V_{refL}$ to control the waveform of the detected current voltage Vis. The second pulse divider 23b further includes a NOT logic IC3 that inverts the output of the positive hysteresis comparator HCH, an AND logic IC2' that performs an AND operation between the output of the NOT logic IC3 and the driving signal Sa and outputs a positive driving signal SaH, an AND logic IC2 that performs an AND operation between the output of the negative hysteresis comparator HCL and the driving signal Sa and outputs a negative driving signal SaL, and an AND logic IC4 that carries out an AND logic between the positive driving signal SaH and the negative driving signal SaL and outputs the driving signal Sa1 which is a result of the AND logic. The current control range is a target control range for the power supply current Is of the AC power supply 1, the upper limit threshold is a threshold for controlling the upper limit of a short circuit current flowing when the short circuit unit 30 is turned on, and the lower limit threshold is a threshold set to a value smaller than the upper limit threshold. Note that reference character $V_d$ in expression (1) represents a low-voltage system power supply, and reference character $V_{OL}$ in expression (2) represents an output saturation voltage of an operational amplifier.

[Expression 1]

$$V_{THH}(H) = V_{refH} + \frac{R_1}{R_1 + R_2 + R_3}(V_d - V_{refH}) \quad (1)$$

[Expression 2]

$$V_{THH}(L) = V_{refH} + \frac{R_1}{R_1 + R_2 + R_3}(V_{refH} - V_{OL}) \quad (2)$$

The current detector 8 illustrated in FIG. 14 includes a level shift circuit and an amplifier provided at the output stage of the current detecting element 9, and converts the waveform of the AC current detected by the current detecting element 9 into a current waveform of only the positive side to output the waveform while assuming the value that is half the low-voltage system power supply Vd illustrated in FIG. 17 corresponds to zero ampere. As a result, the second pulse divider 23b can generate the driving signal Sa1 regardless of the current polarity.

The driving signal Sa1 can be generated regardless of the current polarity by using the second pulse divider 23b composed of the plurality of hysteresis comparators. The waveform of the power supply current Is, that is, the detected current voltage Vis, is controlled by the driving signal Sa1 so that the DC voltage Vdc can be boosted while keeping down the peak value of the short circuit current that flows when the short circuit unit 30 is turned on.

Moreover, the hysteresis comparator can change the width of hysteresis by changing resistance values of resistors R1, R1', R2, R2', R3, and R3'. For example, a series circuit of a switch and a resistor can be connected in parallel with the resistor R2 or R2' so that a combined resistance value can be changed by opening and closing the switch. When the hysteresis comparator can perform a part of the processing of the controller 20, the operation load of the controller 20 can be reduced and the power converter 100 with an inexpensive central processing unit can be manufactured.

Figure 18:
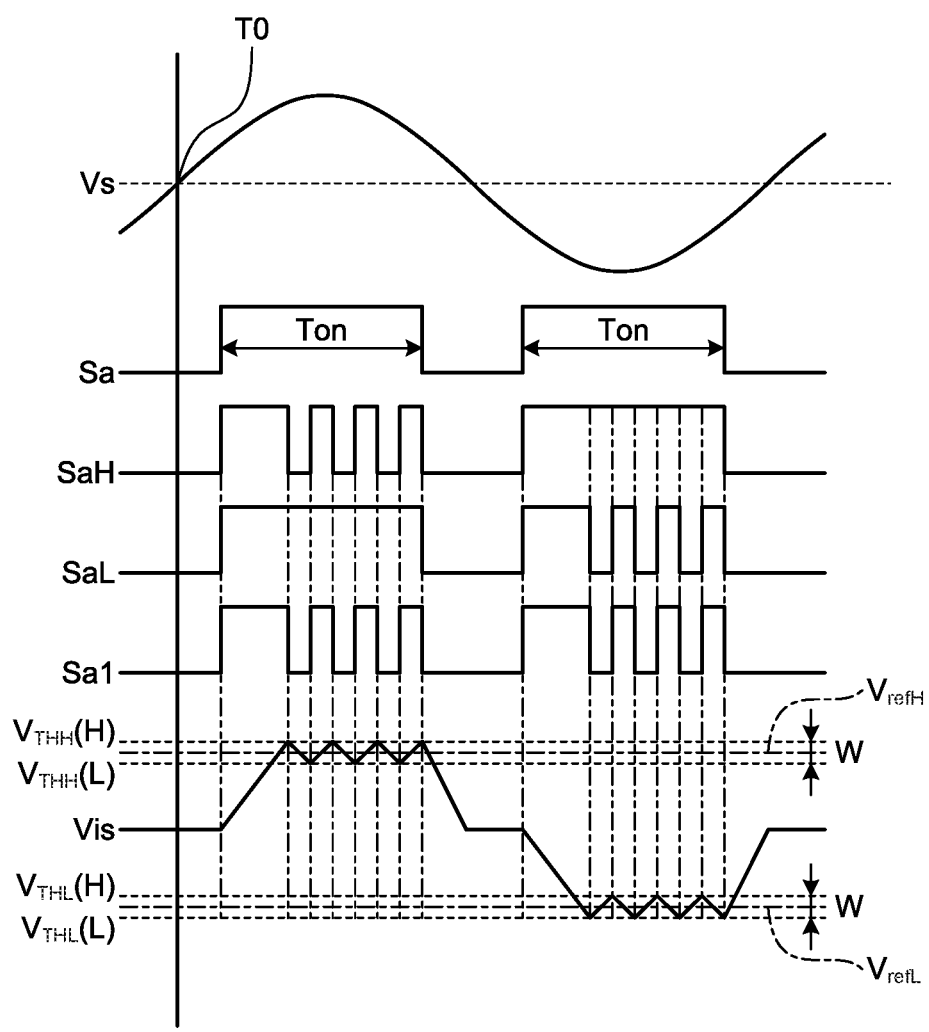
FIG. 18 is a diagram illustrating a waveform of the power supply current when a driving signal is divided into a plurality of pulses in each of a positive half cycle and a negative half cycle.

FIG. 18 is a diagram illustrating the waveform of the power supply current when the driving signal Sa is divided into a plurality of pulses in each of the positive half cycle and the negative half cycle. FIG. 18 illustrates the driving signal Sa generated by the driving signal generation unit 21. The third embodiment assumes that the driving signal Sa is generated once during the half cycle of the power supply, and the period from when the driving signal Sa is turned on to when the driving signal is turned off corresponds to the on time Ton.

FIG. 18 further illustrates the positive driving signal SaH, the negative driving signal SaL, a positive upper limit threshold $V_{THH}$ (H), a positive lower limit threshold $V_{THH}$ (L), a negative upper limit threshold $V_{THL}$ (H), and a negative lower limit threshold $V_{THL}$ (L) when the second pulse divider 23b performs the division operation.

When the pulse division operation is performed on each of the positive side and the negative side of the AC power supply 1, the peak value of the power supply current Is on the positive side falls within a current control range W with the positive reference voltage $V_{refH}$ as the central value, and the peak value of the power supply current Is on the negative side falls within a current control range W with the negative reference voltage $V_{refL}$ as the central value.

Note that when the switching frequency is relatively high, an increase in loss, radiation noise, and a noise terminal voltage caused by switching may become a problem. In order to solve such a problem, the driving signal Sa1 is switched a fewer number of times by increasing the current control range W with the reference voltage $V_{ref}$ as the central value. Accordingly, the switching frequency is lowered so that the increase in loss, the radiation noise, and the noise terminal voltage can be reduced.

On the other hand, when the switching frequency is relatively low, noise in the audible frequency range may become a problem. In order to solve such a problem, the driving signal Sa1 is switched a greater number of times by decreasing the current control range W with the reference voltage $V_{ref}$ as the central value. Accordingly, the switching frequency is increased and the noise can be reduced.

Next, the configuration of the first pulse divider 23a will be described. When the first pulse divider 23a is used to perform switching of the short circuit unit 30, the on/off timing of the short circuit unit 30 needs to be determined. For such purpose, a rise time Ta of the driving signal Sa and a fall time Tb of the driving signal Sa need to be specified.

Figure 19:
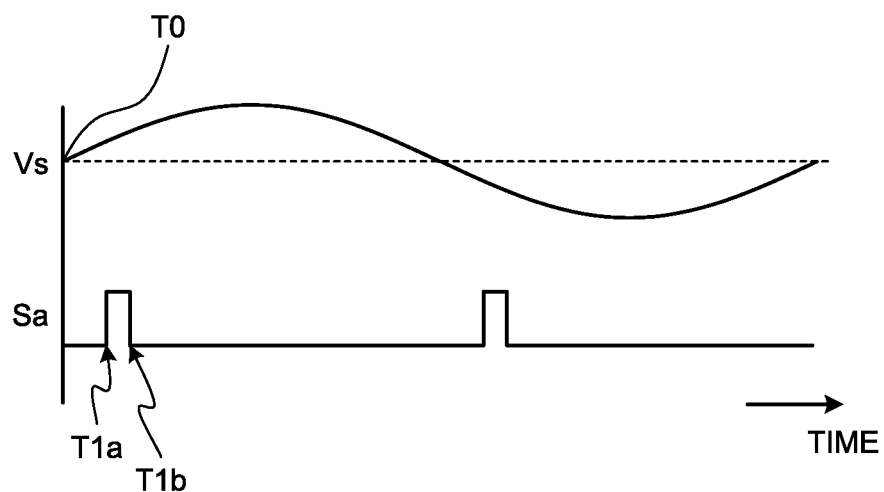
FIG. 19 is a diagram illustrating a driving signal for switching the short circuit unit once during the half cycle of the power supply.
Figure 20:
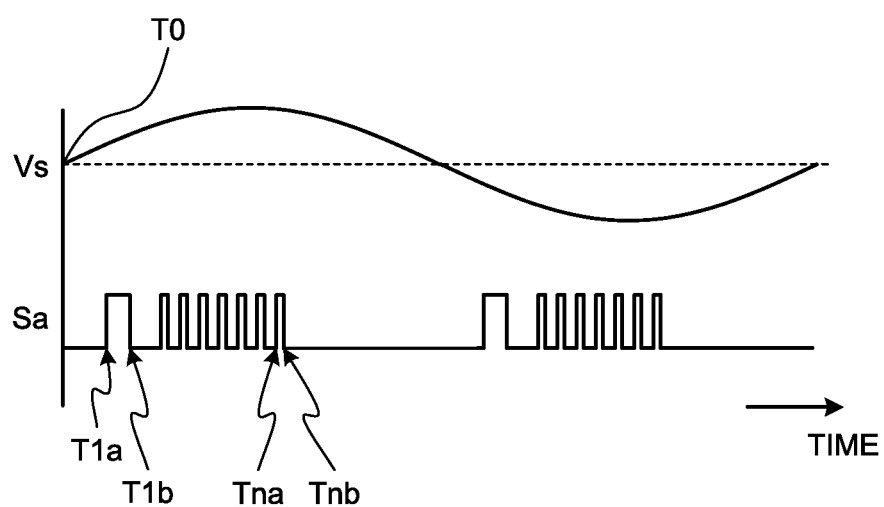
FIG. 20 is a diagram illustrating a driving signal for switching the short circuit unit a plurality of times during the half cycle of the power supply.

FIG. 19 is a diagram illustrating the driving signal for switching the short circuit unit 30 once during the half cycle of the power supply, and FIG. 20 is a diagram illustrating the driving signal for switching the short circuit unit 30 a plurality of times during the half cycle of the power supply.

The rise time of the driving signal Sa at a point when the on start time elapses from the zero crossing point T0 is denoted by reference character T1a, and the fall time of the driving signal Sa is denoted by reference character T1b. The on and off timings of the short circuit unit 30 can be specified by holding the time from the zero crossing point T0 to the rise time T1a and the time from the zero crossing point T0 to the fall time T1b as data, for example. When these pieces of time data are used, the first pulse divider 23a can switch the short circuit unit 30 once during the half cycle of the power supply as illustrated in FIG. 19.

On the other hand, when the short circuit unit 30 is switched N times during the half cycle of the power supply as illustrated in FIG. 20, the rise time of an n-th driving signal Sa at the point when the on start time elapses from the zero crossing point T0 is denoted by reference character Tna, and the fall time of the n-th driving signal Sa is denoted by reference character Tnb. The character "N" is an integer of two or more.

In this case, the number of data held needs to be proportional to the value of "n" in order to specify the on and off timings of the short circuit unit 30, where the number of control parameters increases as the number of switching operations increases. Designing of the control parameters becomes complicated depending on operating conditions such as a DC voltage command, a load size, and a load type, and an increase in the number of switching operations results in a large amount of time required to verify or evaluate data reliability.

Verification or evaluation of data reliability is not required in the case of using the second pulse divider 23b composed of hardware, but size or cost constraints may cause a change in the hardware configuration difficult when the hardware configuration requires a change in order to be suited to the operating conditions.

Focusing on the tendency of a change over time in the on time and off time of the plurality of driving signals Sa1 generated during the half cycle of the power supply such that the peak value of the power supply current Is falls within the current control range W, the inventor of the present application has derived the power converter 100 that prevents an increase in the number of control parameters, reduces the time and burden required for verifying or evaluating reliability, and has high reliability while achieving high efficiency without causing a significant increase in cost.

Figure 21:
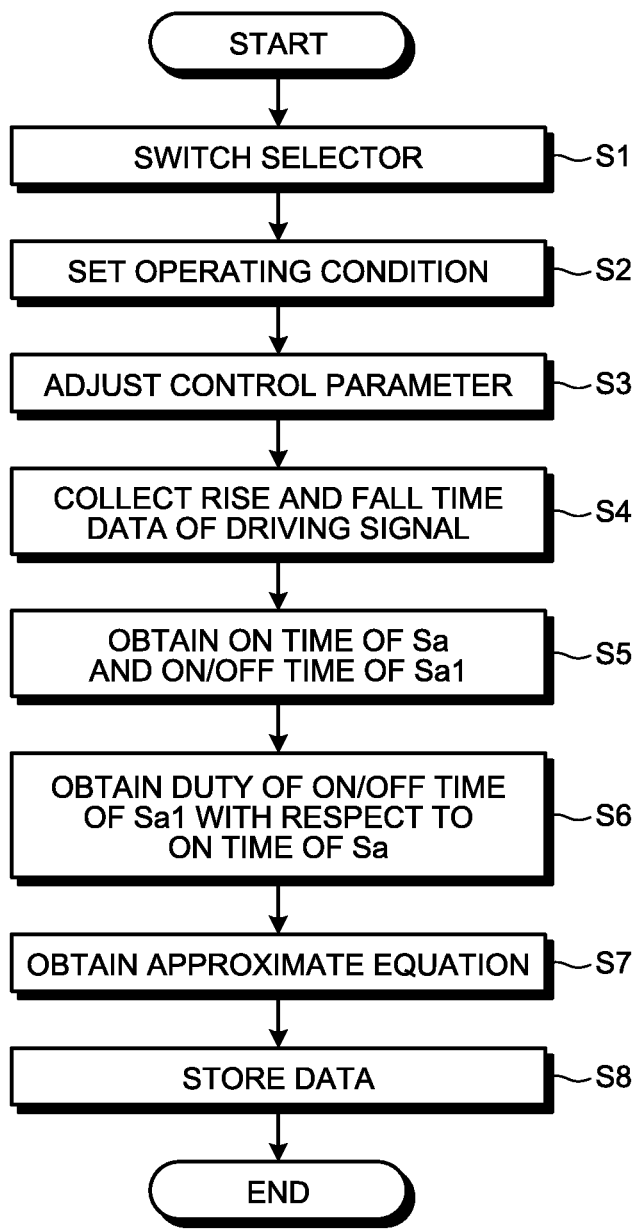
FIG. 21 is a flowchart illustrating a procedure for generating data used in a first pulse divider.

FIG. 21 is a flowchart illustrating a procedure for generating data used by the first pulse divider 23a. Here, there will be described an example of obtaining data to be stored in the data storage 23c by using the plurality of driving signals Sa1 generated by the second pulse divider 23b illustrated in FIG. 14.

(Step S1)

The connection of the internal contact of the selector 23d illustrated in FIG. 14 is switched to the Y input terminal. As a result, the driving signal Sa1 can be obtained automatically using the driving signal Sa generated by the driving signal generation unit 21.

(Step S2)

The operating condition is set in the driving signal generation unit 21.

(Step S3)

The current limit level and the current control range W of the power supply current Is are adjusted. The current limit level is determined by the positive reference voltage $V_{refH}$ and the negative reference voltage $V_{refL}$. The current control range W is determined by the resistance values of the resistors R1, R1', R2, R2', R3, and R3' illustrated in FIG. 17. These limited parameters are used to adjust the current limit level and the current control range W such that desired boosting performance, power factor of the power supply, or harmonic current can be obtained.

(Step S4)

The rise time and the fall time of the driving signal Sa that is generated by the driving signal generation unit 21 are collected from the operating condition set in step S2 and the parameters adjusted in step S3, and at the same time the rise time and the fall time of each of the plurality of driving signals Sa1 that are generated by the second pulse divider 23b are collected by using the parameters in step S3. Data collection is performed by analysis or actual equipment.

(Step S5)

The pieces of data collected in step S4 are used to measure the on time Ton of the driving signal Sa, the on time Ton of each driving signal Sa1, and the off time Toff of each driving signal Sa1.

Figure 22:
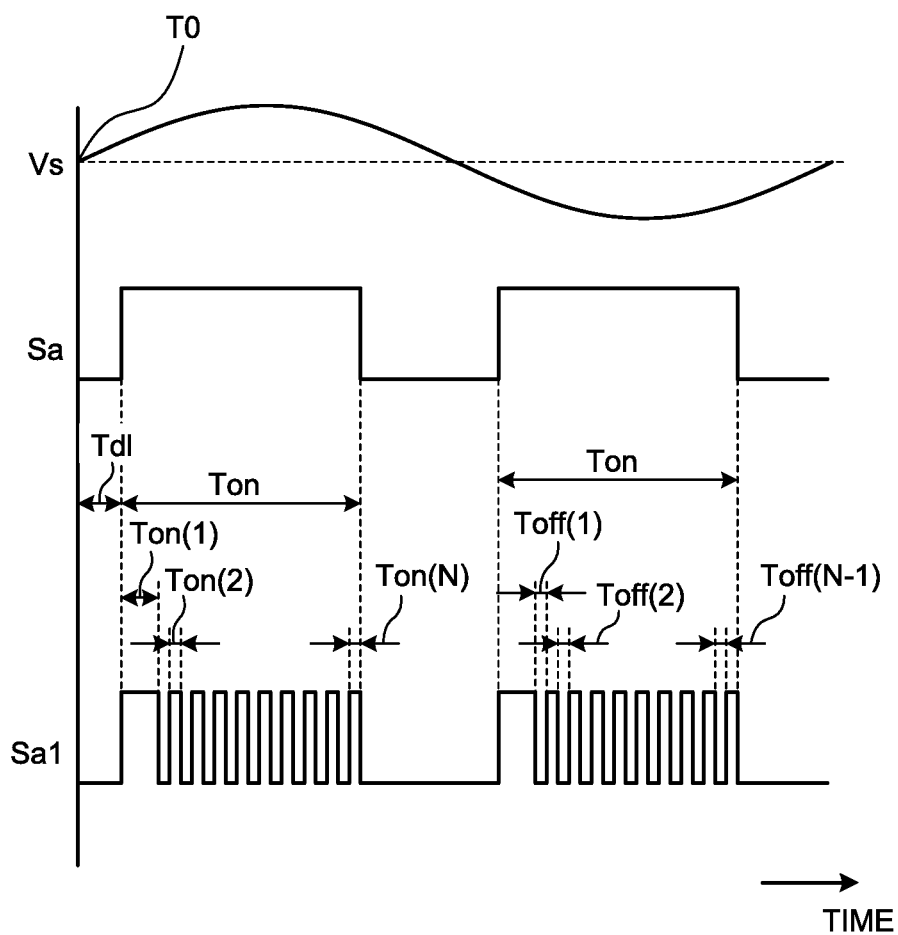
FIG. 22 is a diagram illustrating an on time of a driving signal generated by a driving signal generation unit, an on time of a driving signal generated by a pulse division unit, and an off time of the driving signal generated by the pulse division unit.

FIG. 22 is a diagram illustrating the on time Ton of the driving signal Sa that is generated by the driving signal generation unit 21, the on time Ton of the driving signal Sa1 that is generated by the pulse division unit 23, and the off time Toff of the driving signal Sa1 that is generated by the pulse division unit 23.

FIG. 22 illustrates the driving signal Sa that is generated once in each of the positive half cycle and the negative half cycle of the power supply voltage Vs, and the N driving signals Sa1 that are generated during the on time Ton of the driving signal Sa. The character "N" is an integer of two or more.

The driving signal Sa and the first driving signal Sa1 are both turned on at the point when the on start time Tdl elapses from the zero crossing point T0 from which the power supply voltage Vs rises. Reference character Ton (1) represents the on time of the first driving signal Sa1 generated within the positive half cycle, that is, the time from the rise of the first driving signal Sa1 to the fall thereof. Reference character Ton (2) represents the on time of the second driving signal Sa1 generated within the positive half cycle, and Ton (N) represents the on time of the N-th driving signal Sa1 generated within the positive half cycle.

Likewise, the driving signal Sa and the first driving signal Sa1 are both turned on at the point when the on start time elapses from the zero crossing point from which the power supply voltage Vs drops. Reference character Toff (1) represents the off time between the first driving signal Sa1 and the second driving signal Sa1 that are generated within the negative half cycle, that is, the time from the fall of the first driving signal Sa1 to the rise of the second driving signal Sa1. Reference character Toff (2) represents the off time between the second driving signal Sa1 and the third driving signal Sa1 that are generated within the negative half cycle, and Toff (N−1) represents the off time between the (N−1)-th driving signal Sa1 and the N-th driving signal Sa1 that are generated within the negative half cycle.

The on time Ton of the driving signal Sa, the on time Ton of each driving signal Sa1, and the off time Toff of each driving signal Sa1 illustrated in FIG. 22 are obtained by the rise time and fall time of the driving signal Sa as well as the rise time and fall time of each of the first to N-th driving signals Sa1 collected in step S4. Moreover, a pulse number of each driving signal Sa1 and an inter-pulse number assigned between adjacent driving signals Sa1 are obtained in the order in which the rise and fall times of the driving signals Sa1 are collected.

(Step S6)

Next, the on time and off time of each driving signal Sa1 obtained in step S5 are used to obtain an on-duty of the on time Ton of each driving signal Sa1 with respect to the on time Ton of the driving signal Sa, and an off-duty of the off time Toff of each driving signal Sa1 with respect to the on time Ton of the driving signal Sa.

One can find regularity in the on-duty and off-duty when focusing on the tendency of the change over time in the on time and off time of the plurality of driving signals Sa1 generated during the half cycle of the power supply as described above. A specific description will be given below.

The following functions are defined in calculating the on-duty and off-duty.

[Expression 3]

$$\text{on\_duty}(x) = \frac{T_{on}(x)}{T_{on}} \quad \{1 \leq x \leq N\} \quad (3)$$

[Expression 4]

$$\text{off\_duty}(y) = \frac{T_{off}(y)}{T_{on}} \quad \{1 \leq y \leq (N-1)\} \quad (4)$$

Expression (3) expresses the on-duty of the on time Ton (x) of an x-th driving signal Sa1 during the half cycle of the power supply with respect to the on time Ton of the driving signal Sa. The character "N" represents the total number of driving signals Sa1 generated during the half cycle of the power supply.

Expression (4) expresses the off-duty of the off time Toff (y) between the x-th driving signal Sa1 and an (x−1)-th driving signal Sa1 during the half cycle of the power supply with respect to the on time Ton of the driving signal Sa. The character "N" represents the total number of driving signals Sa1 generated during the half cycle of the power supply.

Figure 23:
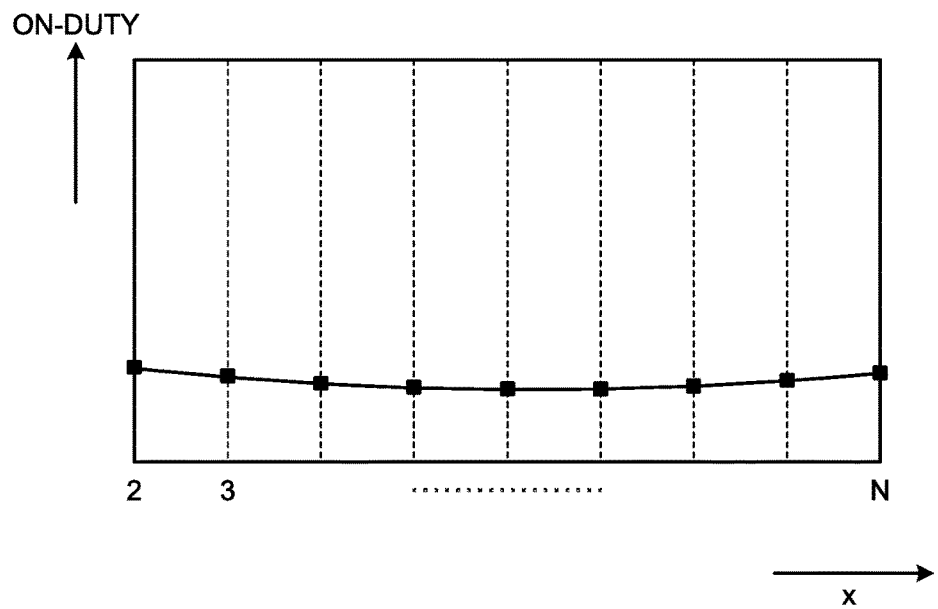
FIG. 23 is a diagram illustrating a change over time in the on-duty of N driving signals generated during the half cycle of the power supply.

FIG. 23 is a diagram illustrating a change over time in the on-duty of the N driving signals Sa1 generated during the half cycle of the power supply. The horizontal axis represents the pulse number x which is the number assigned to each of the second to N-th driving signals Sa1 out of the N driving signals Sa1 generated during the half cycle of the power supply, and the vertical axis represents the on-duty of the second to N-th driving signals Sa1 obtained from expression (3).

Focusing on the pulse train of the second to N-th driving signals Sa1, one can see that the on-duty draws a parabola that is convex downward and has a relatively gentle slope when the peak value of the power supply current Is falls within the current control range W as illustrated in FIG. 18.

Figure 24:
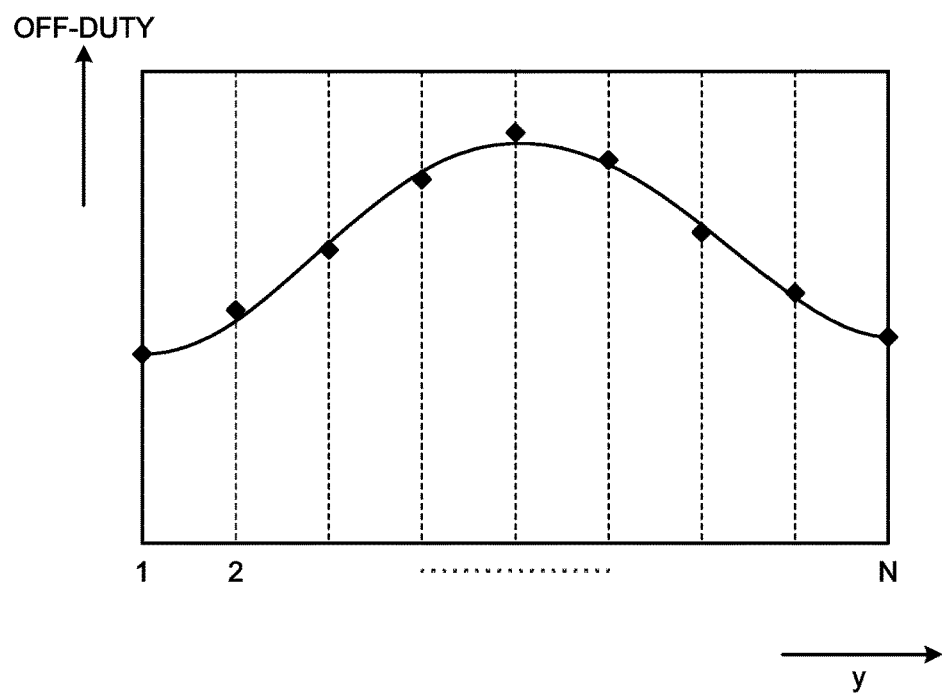
FIG. 24 is a diagram illustrating a change over time in the off-duty of the N driving signals generated during the half cycle of the power supply.

FIG. 24 is a diagram illustrating a change over time in the off-duty of the N driving signals Sa1 generated during the half cycle of the power supply. The horizontal axis represents the inter-pulse number y which is the number assigned between the driving signals Sa1 generated during the half cycle of the power supply, and the vertical axis represents the off-duty value of the first to N-th driving signals Sa1 obtained from expression (4).

Focusing on the pulse train of the first to N-th driving signals Sa1, one can see that the off-duty draws a parabola that is convex upward and has a slope steeper than that of the on-duty when the peak value of the power supply current Is falls within the current control range W as illustrated in FIG. 18.

(Step S7)

As described above, the on-duty and the off-duty of the plurality of driving signals Sa1 generated during the half cycle of the power supply change over time with different tendencies. The inventor of the present application has devised a method of using an approximate equation to express the on-duty and the off-duty of the driving signal Sa1 in a specific region among the plurality of driving signals Sa1 generated in the half cycle of the power supply.

The on-duty has a relatively gentle slope as a characteristic thereof. Thus, the on-duty in expression (3) can be approximated by a quadratic equation expressed in expression (5). Constants in the approximate equation are denoted as A1, B1, and C1.

[Expression 5]

$$\text{on\_duty}(x) = A_1 \cdot x^2 + B_1 \cdot x + C_1 \{1 \leq x \leq N\} \quad (5)$$

The off-duty in expression (4) can be approximated by a quadratic equation; however, the off-duty has the slope that is relatively steep compared to the slope of the on-duty. In the third embodiment, the off-duty is approximated by a quartic equation as in expression (6) in order to increase the degree of freedom for duty setting. Constants in the approximate equation are denoted as A2, B2, C2, D2, and E2.

[Expression 6]

$$\text{off\_duty}(y) = A_2 \cdot y^4 + B_2 \cdot y^3 + C_2 \cdot y^2 + D_2 \cdot E_2 \{1 \leq y \leq (N-1)\} \quad (6)$$

Note that the on-duty of the first driving signal Sa1 which is a pulse outside the specific region can be expressed by expression (7). The character "N" represents the total number of driving signals Sa1 generated during the half cycle of the power supply. As for the on time of the first driving signal Sa1, an error in the approximate equation can be absorbed by using expression (7) without performing on-duty setting.

[Expression 7]

$$\text{on\_duty}(1) = 1 - \sum_{k=2}^{N} \text{on\_duty}(k) - \sum_{k=1}^{N-1} \text{off\_duty}(k) \quad (7)$$

As a result, the approximate equation of the on-duty of the driving signal Sa1 in the specific region among the plurality of driving signals Sa1 generated during the half cycle of the power supply, the approximate equation of the off-duty of the plurality of driving signals Sa1 generated during the half cycle of the power supply, and the on-duty of the driving signal Sa1 outside the specific region are obtained.

(Step S8)

The on-duty obtained in step S7 is associated with the pulse number to be made into a function, the off-duty obtained in step S7 and the inter-pulse number are made into a function, whereby these pieces of data made into the functions and constant data of the approximate equations are stored in the data storage 23c.

The first pulse divider 23a measures the on time Ton of the driving signal Sa from the driving signal generation unit 21 and multiplies the on-duty and the off-duty read from the data storage 23c by the on time Ton of the driving signal Sa, thereby determining the on and off times of the first to N-th driving signals Sa1 during the half cycle of the power supply.

Here, there will be described a case of changing the number of switching operations depending on the load condition. When the number of switching operations needs to be increased in transitioning the load from a light load to a heavy load, the on time Ton of the driving signal Sa input to the first pulse divider 23a and the second pulse divider 23b needs to be increased in order to boost the voltage while reducing the current peak, improving the power factor, and reducing harmonics.

Specifically, the on time can be increased by multiplying the on time Ton of the driving signal Sa by a correction coefficient Kc as expressed in expression (8). In the expression, "Kc" is an integer of one or more and may be set in accordance with a condition for switching the number of switching operations. The on time Ton is multiplied by the correction coefficient Kc at the time of switching the number of switching operations so that a fluctuation in the DC voltage Vdc can be prevented or reduced to obtain a stable DC voltage Vdc.

[Expression 8]

$$Ton = Ton \cdot Kc \qquad (8)$$

When the number of switching operations needs to be decreased in transitioning the load from a heavy load to a light load, the on time Ton of the driving signal Sa input to the first pulse divider 23a and the second pulse divider 23b needs to be decreased in order to boost the voltage while reducing the current peak, improving the power factor, and reducing harmonics.

Specifically, the on time can be decreased by multiplying the on time Ton of the driving signal Sa by a reciprocal of the correction coefficient Kc, as expressed in expression (9). In the expression, "Kc" is an integer of one or more and may be set in accordance with the condition for switching the number of switching operations. The on time Ton is multiplied by the reciprocal of the correction coefficient Kc at the time of switching the number of switching operations so that a fluctuation in the DC voltage Vdc can be prevented or reduced to obtain a stable DC voltage Vdc.

[Expression 9]

$$Ton = Ton \cdot \frac{1}{Kc} \qquad (9)$$

As a result, the on and off timings of the short circuit unit 30 according to the third embodiment is uniquely determined to allow the driving signal Sa to be divided into the plurality of driving signals Sa1 at the on and off timings.

The use of the function expressing the arrangement of the pulse train by the duty as described above allows the on and off timings of the short circuit unit 30 to be specified without increasing the number of control parameters stored in the data storage 23c even when the number of switching operations is increased.

Note that although the third embodiment detects the power supply voltage Vs, the power supply current Is, and the DC voltage Vdc in order to generate the driving signal Sa1, the power supply current Is need not be detected at the time of operating the first pulse divider 23a with the data stored in the data storage 23c. The necessity of detecting the power supply current may be selected in accordance with the system specification constructed.

The third embodiment illustrates the example in which the duty is made into a function. However, data in which the on time and the off time are made into a function or data in which the on time and off time are expressed by quadratic or higher approximate equations may be stored in the data storage 23c and used in the pulse division operation.

The third embodiment illustrates one example of generating pulses by using the approximate equations. However, when the number of driving signals Sa1 generated during the half cycle of the power supply is relatively small, the data on each duty obtained in step S6 or the data on the on time of each pulse and the off time between pulses obtained in step S5 may be stored and used to generate the driving signals Sa1 instead of using the approximate equations. Even with such a configuration, the first pulse divider 23a can perform pulse division so that an increase in cost associated with an improvement on the controller 20 can be prevented.

Moreover, only one of the first pulse divider 23a and the second pulse divider 23b may be used, or these pulse dividers may be switchably used in accordance with the operating condition. When it is difficult to change the configuration of the controller 20 due to size or cost constraints, only the first pulse divider 23a is used by connecting the internal contact of the selector 23d to the X terminal. When the accuracy of generating the waveform of the power supply current Is needs to be increased for use in various specification environments with the cost constraints not being high, only the second pulse divider 23b is used by connecting the internal contact of the selector 23d to the Y terminal. When a specific pulse pattern needs to be output irrespective of the power supply current for noise reduction under a certain operating condition while increasing the accuracy of generating the waveform, the first pulse divider 23a and the second pulse divider 23b are used in combination by switching the connection of the internal contact of the selector 23d between the X terminal and the Y terminal in accordance with the operating condition.

The third embodiment illustrates the example of obtaining the data to be stored in the data storage 23c by using the driving signals Sa1 generated by the second pulse divider 23b. However, the configuration is not limited to this example. Alternatively, a function in which the on-duty of each driving signal Sa1 is associated with the pulse number and a function in which the off-duty of each driving signal Sa1 is associated with the inter-pulse number may be obtained in advance by analysis on the basis of the on and off times of each driving signal Sa1 such that the peak value of the power supply current Is falls within the current control range W during the on time Ton of the driving signal Sa, and these function data and constant data of an approximate equation may be stored in the data storage 23c.

The third embodiment illustrates the operation example of generating the power supply current Is of a rectangular waveform by making the value of the reference voltage $V_{ref}$ constant. However, the power supply current Is having the waveform other than the rectangular waveform may be generated by changing the reference voltage $V_{ref}$ over time.

The third embodiment controls the peak value of the power supply current Is to fall within the current control range W. However, the peak value of the power supply current Is may depart from the current control range W as long as the amount of harmonic generated does not become a problem. Specifically, the peak value of the power supply current Is may exceed the current limit level in a case where the pulse width of one of the plurality of driving signals Sa1 is large.

Note that in the first to third embodiments, the reactor 2 is inserted between the AC power supply 1 and the rectifier circuit 4, and the rectifier circuit 4 is connected to the AC power supply 1 via the reactor 2. However, the power converter 100 need only perform short-circuiting and opening of the power supply via the reactor 2 so that the positional relationship among the rectifier circuit 4, the reactor 2, and the short circuit unit 30 is not limited to the configuration in the illustrated example. That is, it is sufficient that the power converter 100 is configured such that the power supply current Is flows through the AC power supply 1, the reactor 2, the short circuit unit 30, and the AC power supply 1 in this order at the time of short circuit. For example, the rectifier circuit 4 may be inserted between the AC power supply 1 and the reactor 2, and the reactor 2 may be connected to the AC power supply 1 via the rectifier circuit 4.

Moreover, the first to third embodiments detect the zero crossing point of the power supply voltage Vs and establish synchronization with the power supply voltage Vs with the zero crossing point as a base point. However, the present invention is not limited to such a configuration. For example, the controller 20 may detect the peak value of the power supply voltage Vs and establish synchronization with the power supply voltage Vs with this peak value as a base point.

Furthermore, the power converter 100 of the first to third embodiments controls the number of short circuit operations of the short circuit unit 30 in synchronization with the power supply voltage detected by the power supply voltage detector 7. However, instead of the power supply voltage detector 7, a synchronization signal detector that detects a synchronization signal which is in synchronization with the AC voltage of the AC power supply 1 may be used to control the number of short circuit operations of the short circuit unit 30 in synchronization with the synchronization signal.

The following concepts can be derived according to the power converter of the first to third embodiments described above. That is, the power converter according to the first to third embodiments includes the rectifier that converts AC power from the AC power supply into DC power, the short circuit unit that short-circuits the AC power supply via the reactor, and the controller that controls the short circuit operation of the short circuit unit. The controller performs control to change the number of switching operations, that is, the number of the short circuit operations of the short circuit unit during the half cycle of the output waveform of the AC power supply on the basis of the load condition, and cause the delay time before short circuit from the zero crossing point of the output waveform of the AC power supply after changing the number of the short circuit operations to vary from the delay time before short circuit from the zero crossing point of the output waveform of the AC power supply before changing the number of the short circuit operations. Such control can prevent or reduce a fluctuation in the DC voltage even when the number of switching operations of the short circuit unit that short-circuits the AC power supply is changed in accordance with a load. Such control can also prevent or reduce an excessive increase in the power supply current even when the number of switching operations of the short circuit unit that short-circuits the AC power supply is changed in accordance with a load.

Note that when the number of the short circuit operations during the half cycle of the output waveform of the AC power supply is increased, the delay time after the increase in the number of the short circuit operations can be longer or shorter than the delay time before the increase in the number of the short circuit operations. That is, the gist of the present invention is to change the delay time after the increase in the number of the short circuit operations from the delay time before the increase in the number of the short circuit operations, when the number of the short circuit operations during the half cycle of the output waveform of the AC power supply is increased.

When the number of the short circuit operations during the half cycle of the output waveform of the AC power supply is decreased, the delay time after the decrease in the number of the short circuit operations can be longer or shorter than the delay time before the decrease in the number of the short circuit operations. That is, the gist of the present invention is to change the delay time after the decrease in the number of the short circuit operations from the delay time before the decrease in the number of the short circuit operations, when the number of the short circuit operations during the half cycle of the output waveform of the AC power supply is decreased.

Note that the controller may include the driving signal generation unit that generates the driving signal being an on signal with a width corresponding to the length of the period, and the pulse division unit that divides the driving signal into the plurality of switching pulses. The pulse division unit divides the driving signal into the plurality of switching pulses by using data in which the on times of the plurality of switching pulses, the off times of the plurality of switching pulses, and numbers of the plurality of switching pulses are associated with one another. Such a configuration makes a complex calculation unnecessary in generating the plurality of driving signals Sa1 by using the driving signal Sa, and does not cause an increase in a design load of data set in the controller.

Alternatively, the pulse division unit may divide the driving signal into the plurality of switching pulses by using data in which the on-duty of the on time of the plurality of switching pulses with respect to the on time of the driving signal and the off-duty of the off time of the plurality of switching pulses with respect to the on time of the driving signal are expressed by a function based on the numbers of the plurality of switching pulses. The division operation using such data can specify the on and off timings of the short circuit unit even when the number of switching operations is increased. Moreover, the use of a costly memory is unnecessary because the number of control parameters stored in the data storage can be kept small. Furthermore, the time and burden required for verifying or evaluating the reliability of data can be reduced so that an increase in cost required for designing or verification can be reduced.

The power converter may further include a power supply voltage detector that detects the power supply voltage in synchronization with the AC power supply, where the controller may perform control to vary the period after the number of the short circuit operations is changed from the period before the number of the short circuit operations is changed in synchronization with the power supply voltage acquired by the power supply voltage detector. Such control in synchronization with the power supply voltage allows the short circuit unit to be switched at an appropriate timing, thereby effectively improving the power factor and reducing harmonics. Moreover, the number of the short circuit operations can be corrected in accordance with a fluctuation in the frequency of the AC power supply voltage, whereby a system with high robustness can be constructed.

Figure 25:
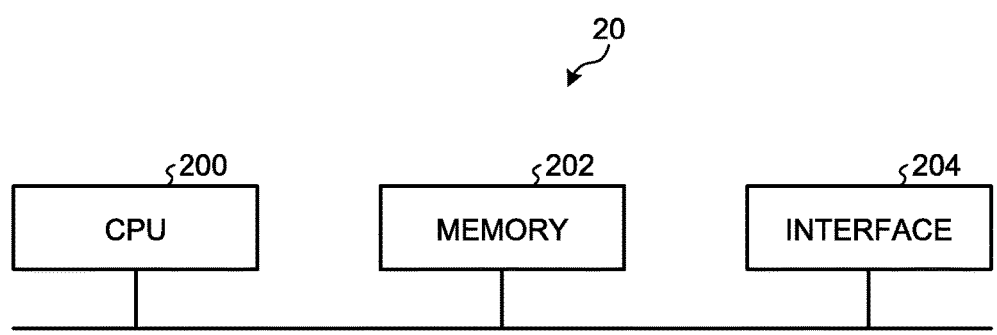
FIG. 25 is a block diagram illustrating a hardware configuration of a controller according to the present embodiment.

Finally, the hardware configuration of the controller 20 will be described. FIG. 25 is a block diagram illustrating the hardware configuration of the controller 20 according to the present embodiment. When functions of the main parts of the controller 20 according to the present embodiment are implemented in software, as illustrated in FIG. 25, the controller can include a central processing unit (CPU) 200 that performs calculation, a memory 202 that stores a program read by the CPU 200, and an interface 204 that inputs and outputs signals. Note that the CPU 200 may be one that is referred to as an arithmetic unit, a microprocessor, a microcomputer, a processor, or a digital signal processor (DSP). The memory 202 can be, for example, a non-volatile or volatile semiconductor memory such as a random access memory (RAM), a read only memory (ROM), a flash memory, an erasable programmable ROM (EPROM), or an electrically EPROM (EEPROM), a magnetic disk, a flexible disk, an optical disk, a compact disc, a mini disc, a digital versatile disc (DVD), or a Blu-ray (registered trademark) Disc (BD).

Specifically, the memory 202 stores a program for executing the function of the driving signal waveform generation unit 50 in the controller 20. The CPU 200 executes the processing of the flowchart illustrated in FIG. 21 and also executes arithmetic processing expressed by expressions (1) to (9). The CPU 200 receives, through the interface 204, the DC voltage Vdc detected by the DC voltage detector 6, the power supply voltage Vs of the AC power supply 1 detected by the power supply voltage detector 7, and the power supply current Is flowing through the reactor 2 detected by the current detection means 10. The CPU 200 outputs the driving signal Sa2 being generated to the short circuit unit 30 via the interface 204.

Note that in view of recent circumstances where the performance of the CPU 200 and the interface 204 has made remarkable progress, the first pulse divider 23a which is described to be implemented by hardware may also be implemented by software processing using a microcomputer. The implementation by software processing involves replacing processing by an analog signal with processing by a digital signal.

The configuration illustrated in the aforementioned embodiments merely illustrates an example of the content of the present invention, and can thus be combined with another known technique or partially omitted and/or modified without departing from the scope of the present invention.

The invention claimed is:

1. A power converter comprising
a rectifier configured to convert AC power from an AC power supply into DC voltage,
a smoothing capacitor that is connected to a DC output of the rectifier,
a short-circuiting circuit to short-circuit the AC power supply via a reactor, and
a controller configured to
set a first number of short circuit operations of the short-circuiting circuit during a first half cycle of the AC power supply,
set a first delay time before an initial short circuit from a zero crossing point of the AC power supply during the first half cycle of the AC power supply,
set a second number of short circuit operations during a second half cycle of the AC power supply after the first half cycle of the AC power supply, and
set a second delay time before an initial short circuit from a zero crossing point of the AC power supply during the second half cycle of the AC power supply, wherein
the second number of short circuit operations is different from the first number of short circuit operations,
the second delay time is different from the first delay time to reduce a fluctuation in a DC voltage across the smoothing capacitor before and after changing the number of the short circuit operation, and
the second half cycle is adjacent to the first half cycle.

2. The power converter according to claim 1, wherein, when the second number of short circuit operations during the second half cycle of the AC power supply is increased from the first number of short circuit operations during the first half cycle, the controller causes the second delay time to vary from the first delay time so that short circuit after the second delay time is performed at a point that is closer to a peak of the AC power supply during the second half cycle compared to a point at which short circuit after the first delay time is performed.

3. The power converter according to claim 2, wherein the controller includes a driving signal generator to generate a driving signal that is an on signal with a width corresponding to a length of the short circuit operation and a pulse divider to divide the driving signal into a plurality of switching pulses, and the pulse divider divides the driving signal into the plurality of switching pulses by using data in which on times of the plurality of switching pulses, off times of the plurality of switching pulses, and numbers of the plurality of switching pulses are associated with one another.

4. The power converter according to claim 2, wherein the controller includes a driving signal generator to generate a driving signal that is an on signal with a width corresponding to a length of the short circuit operation and a pulse divider to divide the driving signal into a plurality of switching pulses, and the pulse divider divides the driving signal into the plurality of switching pulses by using data in which on-duty of an on time of each of the plurality of switching pulses with respect to an on time of the driving signal and off-duty of an off time of each of the plurality of switching pulses with respect to the on time of the driving signal are expressed by a function based on numbers of the plurality of switching pulses.

5. The power converter according to claim 1, wherein, when the second number of short circuit operations during the second half cycle of the AC power supply is decreased from the first number of short circuit operations during the first half cycle, the controller causes the second delay time to vary from the first delay time so that short circuit after the second delay time is performed at a point that is closer to the zero crossing point of the AC power supply during the second half cycle compared to a point at which short circuit after the first delay time is performed.

6. The power converter according to claim 5, wherein the controller includes a driving signal generator to generate a driving signal that is an on signal with a width corresponding to a length of the short circuit operation and a pulse divider to divide the driving signal into a plurality of switching pulses, and the pulse divider divides the driving signal into the plurality of switching pulses by using data in which on times of the plurality of switching pulses, off times of the plurality of switching pulses, and numbers of the plurality of switching pulses are associated with one another.

7. The power converter according to claim 5, wherein the controller includes a driving signal generator to generate a driving signal that is an on signal with a width corresponding to a length of the short circuit operation and a pulse divider to divide the driving signal into a plurality of switching pulses, and the pulse divider divides the driving signal into the plurality of switching pulses by using data in which on-duty of an on time of each of the plurality of switching pulses with respect to an on time of the driving signal and off-duty of an off time of each of the plurality of switching pulses with respect to the on time of the driving signal are expressed by a function based on numbers of the plurality of switching pulses.

8. The power converter according to claim 1, further comprising a power supply voltage detector to detect a power supply voltage in synchronization with the AC power supply, wherein the controller causes the first delay time before changing the number of the short circuit operation to vary from the second delay time after changing the number of the short circuit operation in synchronization with the power supply voltage acquired by the power supply voltage detector.

9. The power converter according to claim 1, wherein the controller includes a microcomputer.

10. The power converter according to claim 1, wherein the second half cycle is next to the first half cycle.

11. A power converter comprising a rectifier to convert AC power from an AC power supply into DC voltage, a smoothing capacitor that is connected to a DC output of the rectifier, a short-circuiting circuit to short-circuit the AC power supply via a reactor, and a controller to be capable of changing a number of a short circuit operation of the short-circuiting circuit during a half cycle of the AC power supply, wherein
the controller causes a delay time before short circuit from a zero crossing point of the AC power supply before changing the number of the short circuit operation and a delay time before short circuit from a zero crossing point of the AC power supply after changing the number of the short circuit operation to vary to each other to reduce a fluctuation in a DC voltage across the smoothing capacitor before and after changing the number of the short circuit operation,
wherein the controller includes a driving signal generator to generate a driving signal that is an on signal with a width corresponding to a length of the short circuit operation and a pulse divider to divide the driving signal into a plurality of switching pulses, and the pulse divider divides the driving signal into the plurality of switching pulses by using data in which on times of the plurality of switching pulses, off times of the plurality of switching pulses, and numbers of the plurality of switching pulses are associated with one another.

12. A power converter comprising a rectifier to convert AC power from an AC power supply into DC voltage, a smoothing capacitor that is connected to a DC output of the rectifier, a short-circuiting circuit to short-circuit the AC power supply via a reactor, and a controller to be capable of changing a number of a short circuit operation of the short-circuiting circuit during a half cycle of the AC power supply, wherein
the controller causes a delay time before short circuit from a zero crossing point of the AC power supply before changing the number of the short circuit operation and a delay time before short circuit from a zero crossing point of the AC power supply after changing the number of the short circuit operation to vary to each other to reduce a fluctuation in a DC voltage across the smoothing capacitor before and after changing the number of the short circuit operation,
wherein the controller includes a driving signal generator to generate a driving signal that is an on signal with a width corresponding to a length of the short circuit operation and a pulse divider to divide the driving signal into a plurality of switching pulses, and the pulse divider divides the driving signal into the plurality of switching pulses by using data in which on-duty of an on time of each of the plurality of switching pulses with respect to an on time of the driving signal and off-duty of an off time of each of the plurality of switching pulses with respect to the on time of the driving signal are expressed by a function based on numbers of the plurality of switching pulses.

\* \* \* \* \*